US009824327B2

(12) United States Patent
Cartwright et al.

(10) Patent No.: US 9,824,327 B2
(45) Date of Patent: Nov. 21, 2017

(54) SYSTEMS AND METHODS FOR CAPTURING AND MANAGING INFORMATION PERTAINING TO ASSET SPARES INVENTORIES

(71) Applicant: Edifice Technologies Inc., Woodinville, WA (US)

(72) Inventors: Robert Cartwright, Woodinville, WA (US); Kathryn Cartwright, Woodinville, WA (US); Craig Kelly, Banbridge Island, WA (US); Daniel Joyce, Everett, WA (US); Todd Greenwood-Greer, Seattle, WA (US)

(73) Assignee: Edifice Technologies Inc., Woodinville, WA (US)

( * ) Notice: Subject to any disclaimer, the term of this patent is extended or adjusted under 35 U.S.C. 154(b) by 426 days.

(21) Appl. No.: 14/222,988

(22) Filed: Mar. 24, 2014

(65) Prior Publication Data
US 2015/0012566 A1    Jan. 8, 2015

Related U.S. Application Data

(60) Provisional application No. 61/842,883, filed on Jul. 3, 2013.

(51) Int. Cl.
*G06Q 10/08* (2012.01)
*G06K 7/10* (2006.01)
*G06F 17/30* (2006.01)

(52) U.S. Cl.
CPC ..... *G06Q 10/087* (2013.01); *G06F 17/30595* (2013.01); *G06K 7/10297* (2013.01)

(58) Field of Classification Search
None
See application file for complete search history.

(56) References Cited

U.S. PATENT DOCUMENTS

| 7,027,311 B2 | 4/2006 | Vanderelli et al. |
| 2001/0029504 A1* | 10/2001 | O'Kane, Jr. ............ G06Q 10/06 |
| 2003/0036983 A1 | 2/2003 | Hougen et al. |
| 2007/0152049 A1* | 7/2007 | Bar ...................... G06Q 10/087 |
| | | 235/385 |
| 2008/0098454 A1* | 4/2008 | Toh .................... H04L 41/0622 |
| | | 726/1 |
| 2011/0218730 A1* | 9/2011 | Rider .................... G01C 21/00 |
| | | 701/533 |
| 2012/0046978 A1 | 2/2012 | Cartwright |

* cited by examiner

*Primary Examiner* — Paul Danneman
(74) *Attorney, Agent, or Firm* — Benedict R. Dugan; Lowe Graham Jones PLLC

(57) ABSTRACT

The present disclosure describes systems and methods for spares management in a data center context. The described system may provide fully integrated dashboards and spares control mechanisms that visually displays the status of all spares activity including the ability to set alarms to monitor items to avoid potential supply disruptions. The system may also automatically monitor and balance the distribution of spares between multiple data centers.

19 Claims, 27 Drawing Sheets

| Bin | Quantity Ordered | Purchase Order | Ordered | Quantity Delivered | Delivered Date | Canceled |
|---|---|---|---|---|---|---|
| Bin 7: Blanking Plates - 2 | 50 | PO3333333 | 09/04/2012 | 46 | 10/26/2012 | |
| Bin 7: Dell Server Memox | 19 | SC999999822 | 09/14/2012 | 55 | 09/04/2012 | 03/07/2013 |
| Bin 7: Blanking Plates - 2 | 40 | PO788859488 | 07/30/2012 | 19 | | |
| Bin 9: Blanking Plates - 3 | 40 | PO787775 | 07/03/2012 | 50 | 08/15/2012 | |
| Bin 3: Flash Drive - 2.5 | 25 | KC8732233 | 07/01/2012 | 1 | | 10/21/2012 |
| Bin 1: LightSpace Plate - | 40 | PO233429 | 07/10/2012 | 24 | 10/22/2012 | |
| Bin 5: Opt-X Plate - 12 fi | 100 | PO234234 | 07/24/2012 | 109 | 10/19/2012 | |
| Bin 1: LightSpace Plate - | 15 | PO234545 | 08/01/2012 | 11 | 10/19/2012 | |
| Bin 29: Storage | 44 | PO5562234 | 09/06/2012 | 45 | 09/06/2012 | |
| Bin 7: Dell Server Memox | 0 | PO98111111 | 08/06/2012 | 10 | 10/26/2012 | 09/06/2012 |
| Bin 3: Dell MD1000 Disk | 0 | PO90123 | 08/01/2012 | 0 | | 09/06/2012 |
| Bin 29: Storage | 2 | POZZ01 | 09/06/2012 | 13 | 07/26/2013 | 09/06/2012 |
| Bin 3: Dell MD1000 Disk | 16 | PO9987341-4 | 09/04/2012 | 15 | 09/14/2012 | |
| Bin 7: Dell Server Memox | 5 | PO94452300 | 09/05/2012 | 0 | | |
| Bin 7: Dell Server Memox | 15 | KC6733333 | 08/12/2012 | 0 | | |
| Bin 1: LightSpace Plate - | 35 | PO7656686 | 09/11/2012 | 20 | 10/19/2012 | |

SYSTEMS AND METHODS FOR CAPTURING AND MANAGING INFORMATION PERTAINING TO ASSET SPARES INVENTORIES

PRIORITY CLAIM

This application claims the benefit of U.S. Provisional Application Ser. No. 61/842,883, filed Jul. 3, 2013.

TECHNICAL FIELD

The present invention relates to the management of spares inventories and, in particular, to systems and methods for managing spare parts for computing data centers.

BACKGROUND

Organizations and businesses of all sizes and missions, buy a diverse array of assets. By way of example, large companies with data centers may contain computer related assets worth hundreds of millions of dollars. It is estimated between 10 and 15% of this inventory, particularly in data centers, are spares ranging from critical components needed to maintain in-production assets to complete standby systems.

There are other hidden problems that need to be mitigated that are high risk resulting from the inability to track spares movements. Spares become obsolete as they age in the cage. Also cash flow chokes, brought on through overstocking directly impact the bottom line. The significance of these and other situations become exacerbated when multiplied across numerous data centers.

Yet the physical management and audit of spares inventories, particularly in large corporate data centers, today is one of the fundamental challenges that has plagued organizations with data centers throughout history.

Estimates confirm that U.S. industries purchase more than $700 billion per year on parts and supplies to support company operations. Surprisingly, most are not able to justify these investments because they cannot systematically track how spares are used.

To this point, capturing spares data, if carried out at all, has been an almost entirely manual process that consumes valuable people time and is fraught with potential errors.

While recognized as a critical activity, datacenter managers and operators, in many instances with limited resources and human capital and knowing the chances of error are high, choose by necessity to avoid such tasks unless forced by circumstance to do so. The challenge is exacerbated by organizations being at breaking point in terms of budgetary, technology, physical space constraints and a shortage of staff. Due to a lack of transparency, accuracy and visibility, every spare has the potential of being unused, made redundant due to obsolescence, lost all together or even stolen. Today many organizations cannot find spares, tell you the value of them or be able to account for changes in their status. When audits are attempted, countless hours are spent by employees trying to accomplish them through basic applications, spreadsheets and in many cases, manual pen and paper processes.

There are few point based methods that seek to address parts of the problem described but there has not, until now, been a total solution that addresses the comprehensive automation of end-to-end spares management, from their procurement, their receipt, stocking and through to deployment. Equally being able to undertake automated spares inventory that dramatically reduces the cost, time and resources required to undertake such tasks is a critical component. The use of clipboards, pen and paper and spreadsheets are still typical of the tools used. And even when information is captured, there are no standard methods or mechanisms that can be used to integrate the data with other important systems and so doing is extremely difficult.

SUMMARY

The presently described techniques provide a fully integrated spares management system and corresponding methods designed specifically for data centers. The system provides fully integrated dashboards and spares control mechanisms that visually displays the status of all spares activity including the ability to set alarms to monitor items to avoid potential supply disruptions.

The system provides comprehensive, end-to-end unified spares management controls and visibility across inbound goods, inventory management and deployment.

The system further provides pre-built workflows that automate spares receipt, inventory management and audit and deployment smoothing and simplifying spares management.

The system further manages spares by currently on order, manufacturer, model, model type, deployed and enclosure (bin or cage) location.

The system provides full management, tracking and visibility over the movement/deployment of spares across multiple locations and simplifies the inventory audit process and asset operations, before a point of failure.

As a result, the system reduces downtime and loss of operational business support periods. It reduces maintenance costs and purchasing costs related to excessive overstocking and rationalizes the need for increased capital budgets. The system further reduces the potential for lost or stolen spares.

An exemplary system includes a user interface device, a relational database and a processor in data communication with the database and the user interface device. The processor receives relationship and dependency information for spares, their enclosures, related assets, and support entities for a corporation from the user interface device, receives attributes with associated measurements for the spares, their enclosures, related assets, and support entities for the corporation from the user interface device. The attributes with associated measurements are formatted according the specific industry of the corporation. The relationship and dependency information and the attributes are stored with associated measurements into the relational database.

In one embodiment, the system includes a plurality of data transmission devices. Each of the plurality of data transmission devices associated with one of the spares, enclosures, related assets, and support entities for the corporation. The plurality of data transmission devices include data of the associated one of the spares, enclosures, related assets, and support entities. The system also includes a plurality of data collection devices in signal communication with the processor and the plurality of data transmission devices. The plurality of data collection devices retrieves the data from the plurality of data transmission devices. The data transmission devices and data collection devices include at least one of radio frequency identification (RFID) tag and reader/scanners. The processor enters the data received from the data collection devices into the relational database.

In another embodiment, the processor executes a plurality of data Application Program Interfaces (APIs) that integrate data received from the data collection devices into a comprehensive view of the groups, enclosures, assets, and support entities based on the relational database.

In a further embodiment, the processor allows a user to create at least one of a graphical or text based report regarding one or more of the spares, enclosures, related assets, and support entities. The report includes at least one of absolute values, ranges or comparative values of at least a portion of the attributes. The report filters, sorts, or orders the spares, enclosures, related assets, and support entities.

In another embodiment, the processor allows a user to define one or more perimeters within which each of the spares are located and to identify the spares within the one or more perimeters.

In a further embodiment, the database includes a manufacturer's database that stores all spares data in an individual group by manufacturer.

In another embodiment, the processor generates a graphical user interface that provides a dashboard for spares, enclosures, related assets, and support entities.

In a further embodiment, the processor allows a user to modify records of the spares, enclosures, related assets, and support entities, display values of the attributes, and edit the values of the attributes within the relational database.

In another embodiment, the processor allows a user to uniquely identify a location of a spare, its disposition and physical location.

In other embodiments, the processor allows a user to uniquely identify spares identifiers to associate, capture, monitor and timestamp, data with other data pertaining to the spare within the system.

In another embodiment, the processor allows a user to share spares information comprising at least one of a physical spare component data, financial data, order and receipt data, enclosure data and deployment data and permit the management, display and analysis of spares information on a single user interface.

In further embodiments, the processor allows a user to perform at least one of a query, an interrogation, a projection and to set alarms to automate the recording of low stock levels against pre-defined levels allowing users to undertake a replenishment process of spares.

In another embodiment, the user interface allows a user to perform at least one of browse, find, create, update or delete information associated with the spares, enclosures, related assets, and the support entities, and any relationship information. The processor can show via the graphical user interface changes to status of a spare. The processor generates a unique identifier based on a user defined spare search. The unique identifier provides a visual indication of the presence and location of all spares that match the user defined spares search.

BRIEF DESCRIPTION OF THE DRAWINGS

Preferred and alternative examples of the present invention are described in detail below with reference to the following drawings.

FIGS. 6-11 illustrate a spares management user interface provided by an example embodiment.

FIGS. 14-16 illustrate a spares dashboard user interface provided by an example embodiment.

FIGS. 17-22 illustrate example workflows provided by example embodiments.

DETAILED DESCRIPTION

In view of the issues outlined in the Background, above, the described Spares Management system comprehensively addresses the procurement, storage, movement, security and deployment of spares. Data center managers understand that a lack of spares optimization has serious consequences has serious consequences both operationally and financially. Without a system to manage spares there are inevitable negative consequences including not having the right spares on hand at the right time that leads to excessive downtime and operational disruption and overstocking to mitigate risks during outages or disasters. Both have considerable cost and operational implications.

In the following description, certain specific details are set forth in order to provide a thorough understanding of various embodiments of the invention. However, one skilled in the art will understand that the described techniques may be practiced without these details or with various combinations of these details. In other instances, well-known systems and methods associated with, but not necessarily limited to, asset management and methods for operating the same may not be shown or described in detail to avoid unnecessarily obscuring descriptions of the embodiments.

One embodiment is deployed on or used in conjunction with, but is not limited to an Internet-based service and a Web browser. There are pluralities of components for managing spares, integrating all the critical information pertaining to the asset and delivering this information in the needed form for individual stakeholders. Stakeholders have the ability to spatially navigate to a spares location, for example in a building or a room in 2 or 3 dimensions from their desktop, even when they are hundreds or thousands of miles from the physical asset location. These components may include but are not limited to a desktop browser, mobile device applications, spares information repositories and API's; local or remote information synchronization and maintenance of information pertaining to spares and their interdependencies.

Figure 1:
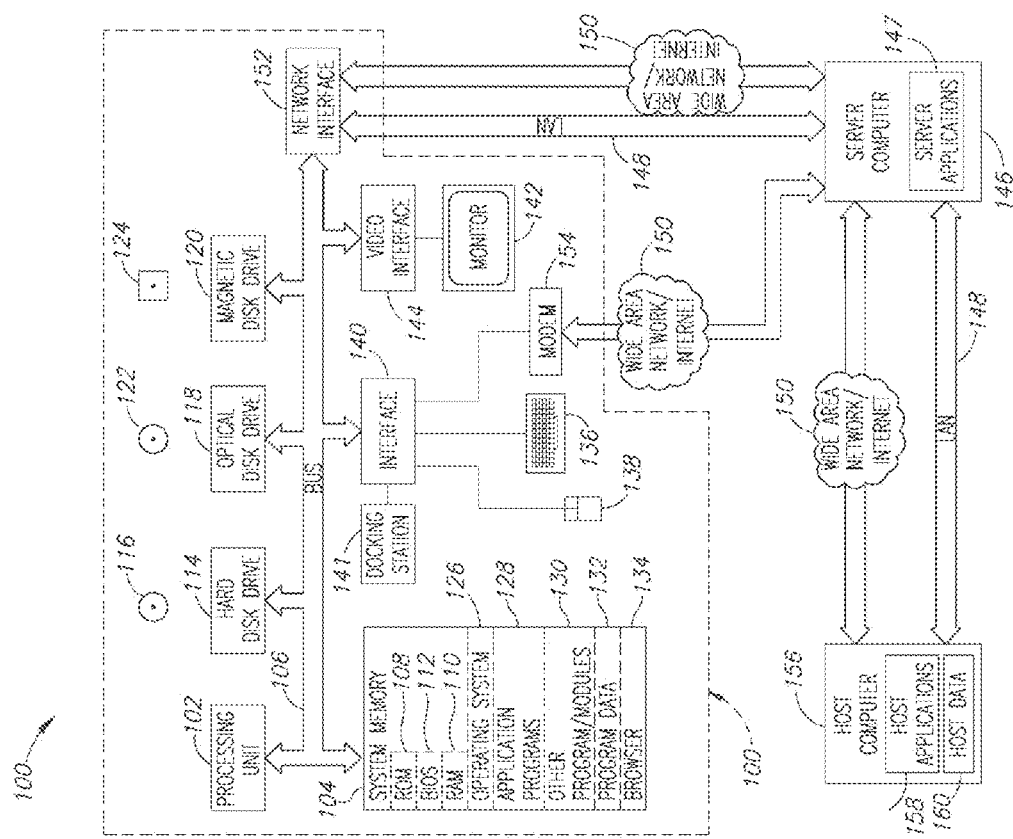
FIG. 1 is a block diagram showing a conventional computer system, various computer peripherals, and various communication means formed in accordance with one embodiment.

FIG. 1 is a diagram showing a conventional computer, various computer peripherals, and various communication means formed according to one embodiment. For purposes of brevity and clarity, embodiments may be described in the general context of computer-executable instructions, such as program application modules, objects, applications, models, or macros being executed by a computer, which may include but are not limited to personal computer systems, hand-held devices, multiprocessor systems, microprocessor-based or programmable consumer electronics, network PCs, mini computers, mainframe computers, and other equivalent computing and processing sub-systems and systems. At least some aspects may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer because, in typical embodiments, there will be more than one computer or other device involved. The processing unit 102 may be any logic processing unit, such as one or more central processing units (CPUs), digital signal processors (DSPs), application-specific integrated circuits (ASICs), etc. Unless described otherwise, the construction and operation of the various blocks shown in FIG. 1 are of conventional design. As a result, such blocks need not be described in further detail herein, as they will be understood by those skilled in the relevant art.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The system memory 104 also includes a browser 134 for permitting the computer 100 to access and exchange data with sources such as web sites of the Internet, corporate intranets, or other networks as described below, as well as other server applications on server computers such as those further discussed below. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a personal data assistant (PDA), a cell phone, or other mobile device.

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

Figure 2:
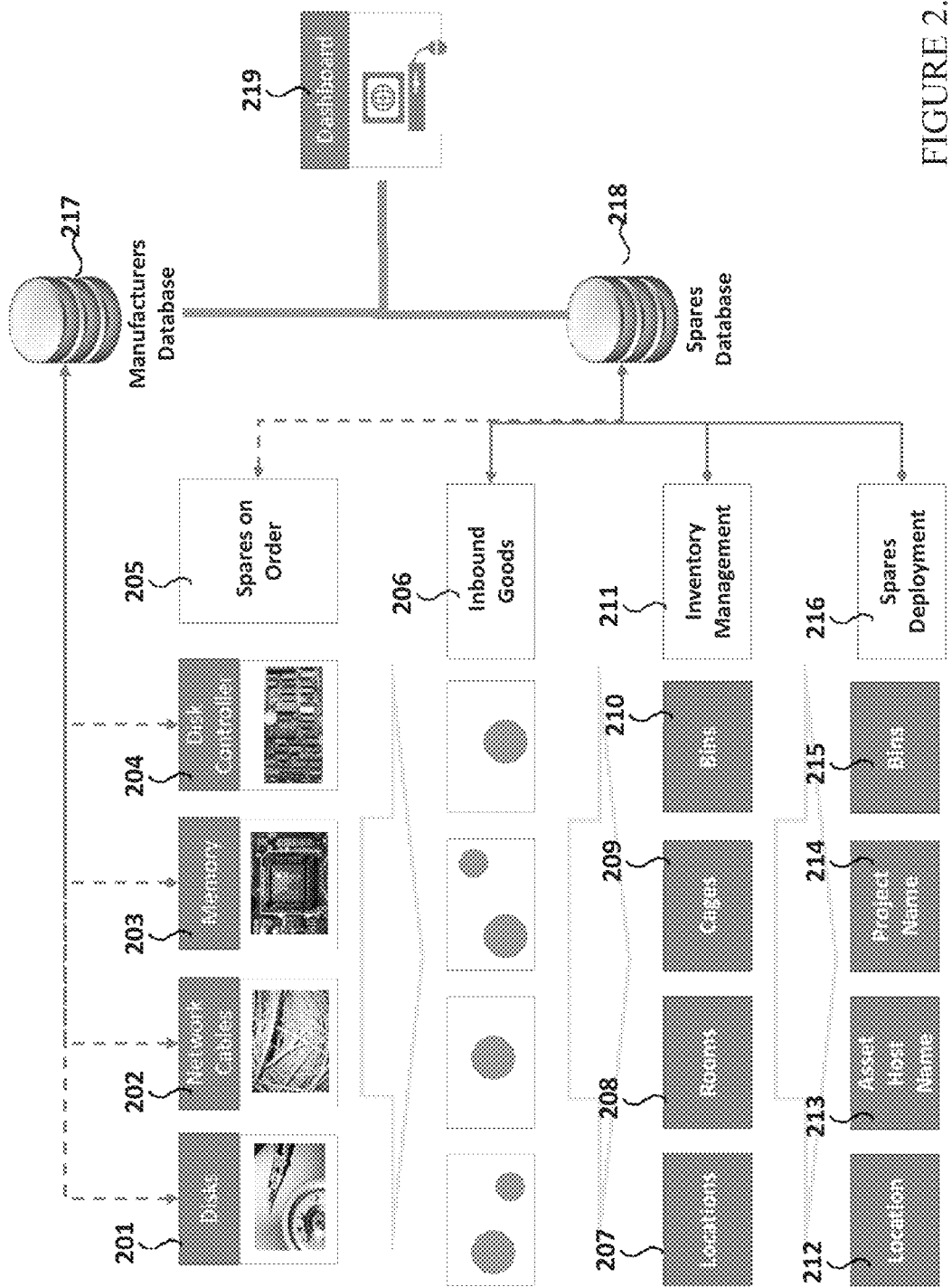
FIG. 2 is a logical view of the process and relationships between spares, enclosure and related entities and examples of such interrelations used by the system of FIG. 1 for capturing and managing spares in disparate locations, their order, receipt, location or enclosure, deployment and audit according to an embodiment.

FIG. 2 is a logical view of the process and relationships between spares, enclosures and related asset entities and examples of such interrelations used by the system of FIG. 1 for capturing and managing spares in disparate locations, their order, receipt, location or enclosure, deployment and audit according to one embodiment.

The illustrated embodiment is a system for capturing and managing spares that have been ordered from external manufacturers. The system provides a manufacturer's database 217, for storing all manufacturer data and details of the spares they provide. A non-exhaustive list of examples of datacenter spares that can be ordered include disks 201, network cables 202, computer memory 203 and computer disk controllers 204. These are cumulatively captured and managed in the spares "On Order" component of the system 205.

Once a spare is received in the unloading bay or inbound goods area 206 they are recorded as received and depending on the nature and value of the spare an RFID tag may be attached and assigned to that spare for future tracking.

The system may manage and track a spare in a location 207, within a specific room in that location 208, and within an enclosure within a rooms, typically a caged area 209, or bin 210.

The system may provide comprehensive, end-to-end inventory management 211, and visibility of the movement and tracking of spares from inbound goods 206 through deployment 216. Once a spare is deployed the system records and tracks the final location, typically within an asset in a rack within a data center 212. The system semantically assigning all spares attributes to the associated asset combined with the asset's own attributes, exemplary examples being asset host name 213 and project name 214. Once a spare is deployed the system updates the enclose information that stored the spare, by example a bin 215, to reflect that the spare has been deployed thus reducing the stock level of this spare type in that enclosure.

Figure 3:
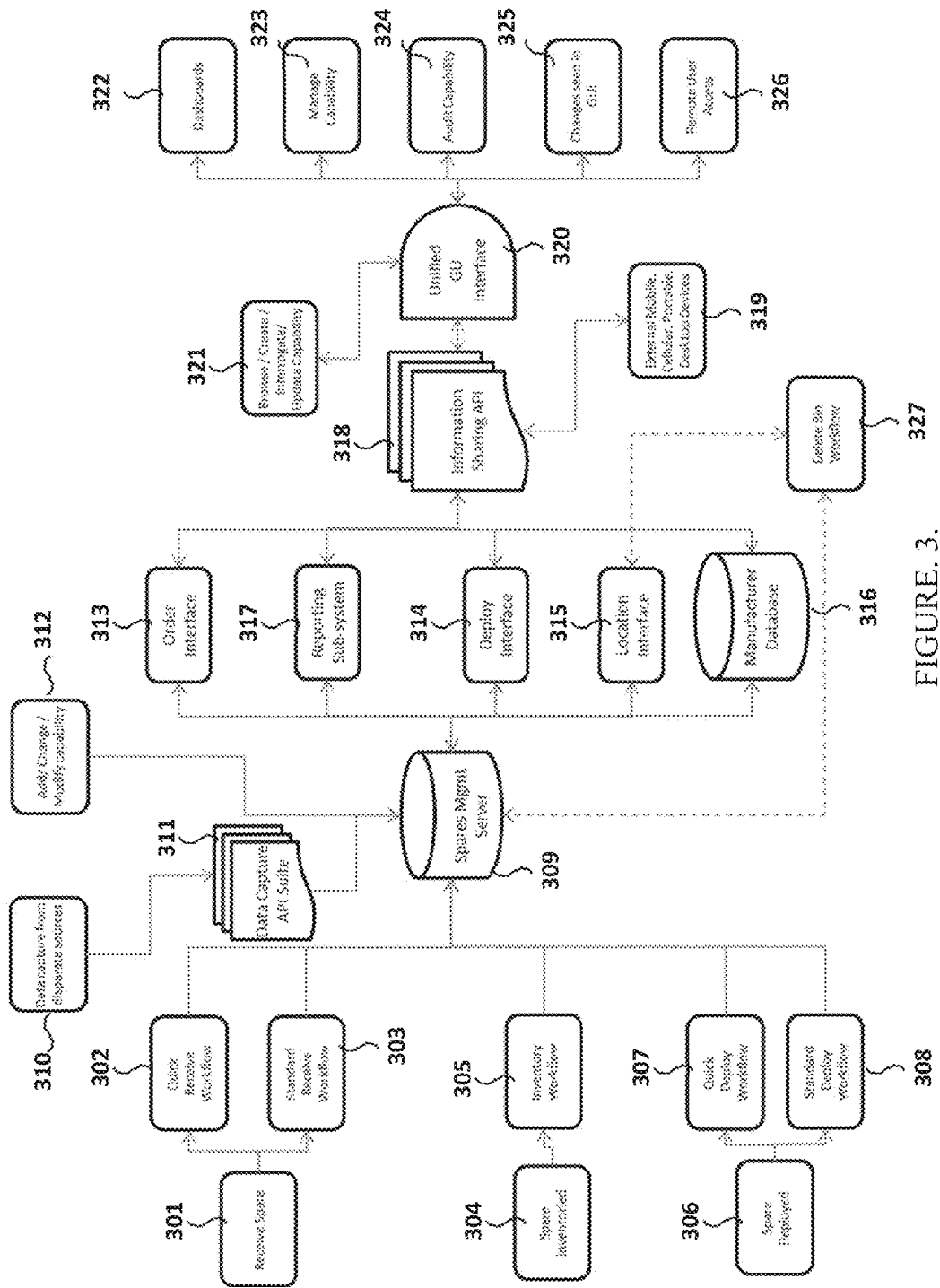
FIG. 3 is a topological view of the system and its components according to one embodiment.

FIG. 3 provides a logical flow diagram of the system and its current components. It shows the inter-relationships between the components and processes of an example embodiment.

Some embodiments include a series of pre-built, pre-defined workflows within the system for capturing and managing spares information, including the following: Standard Receive 303 and Quick Receive 302 workflows are used to manage the receipt of spares 301; Inventory workflow 305 is used to account for, audit and manage spares inventories 304; Standard Deploy 308 and Quick Deploy 307 workflows are used to manage the deployment of spares 306; and Delete Bin workflow 327 is used to remove a now disused enclosure, (cage or bin) from the system.

Some embodiments include a spares management database 309 that holds all the data concerning spares. Information is captured from the pre-built workflows as well as data captured from other disparate sources 310 which may by way of example include financial data, order data, location data.

Some embodiments include a data capture API suite 311 which integrate disparate sources into the spares management database 309.

Users of the system can add, change or modify spares information 312 within the spares management database 309 through dashboards built in a graphical user interface.

The system may be configured for capturing and managing data and details for at least one manufacturer of a spare together with model number, name and spare attributes 316.

Some embodiments include interfaces allowing a user access specific to spares orders 313, spares that have been deployed 314 and the physical location of spares 315.

Some embodiments include a reporting sub-system 317 that allows a user to build custom view reports across the spares lifecycle, by any attribute or combination of attributes.

Some embodiments include information sharing API 318 that enables user access to the system by a user through a graphical users interface 320 or via external mobile devices, cellular devices, portable computers or desktop devices 319.

The graphical user interface 320 may include a series of pre-built dashboards allowing a user access to every aspect of the spares life cycle 322. Using these dashboards, users can fully manage spares 323 and use the browse, create, interrogate and update capability 321. Users can track and monitor spares inventory audits in the audit capability 324. All changes 325 made by any user within the system are immediately available to other authorized users through the graphical user interface or via remote user access 326.

Figure 4:
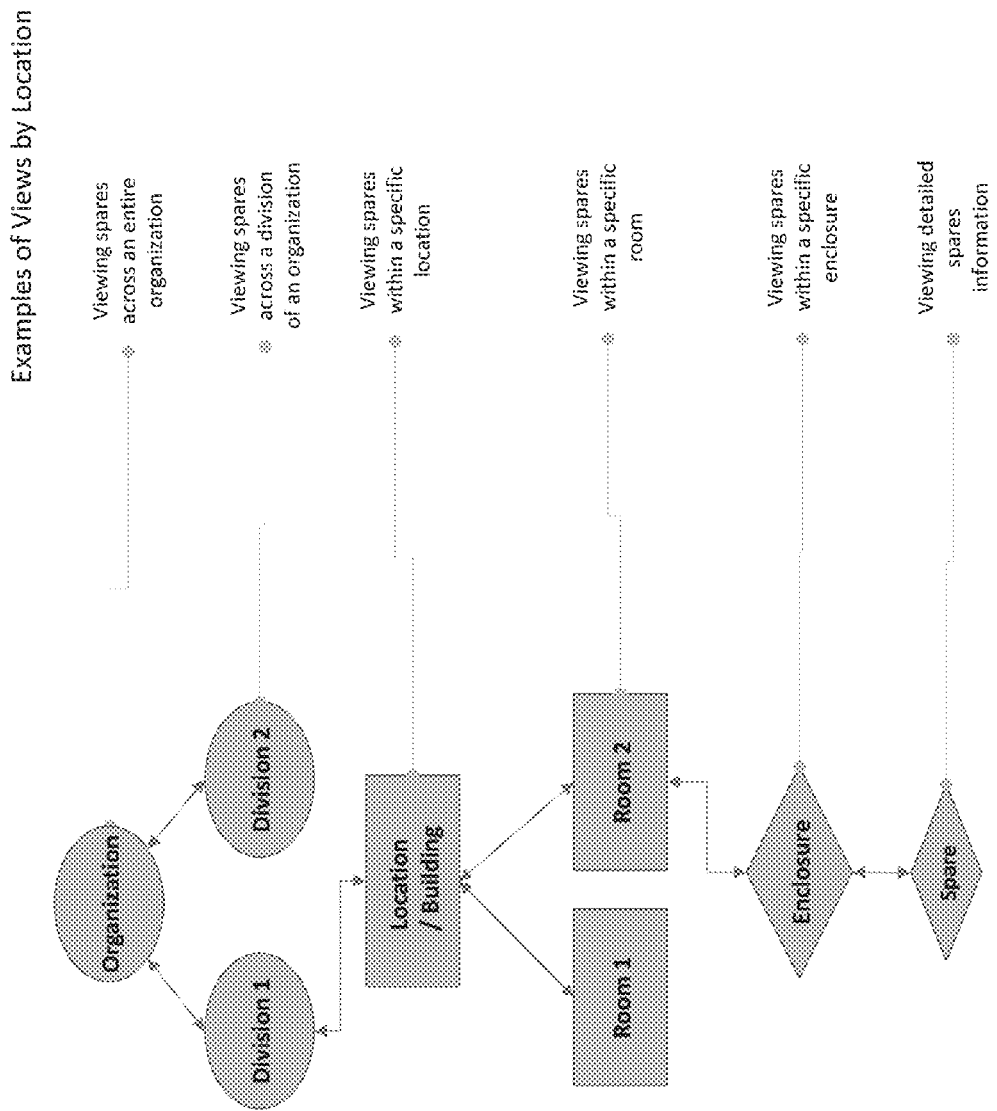
FIG. 4 is a further topological view of the system depicting the hierarchical levels at which spares information is captured, managed and viewed in disparate locations and sub locations according to one embodiment.

FIG. 4 demonstrates how the system can provide a user with different functional levels views of spares within an organization whether for the whole organization a division of an organization, a specific building, a room within a specific building, an enclosure within a specific room or a specific spare within an enclosure.

Figure 5:
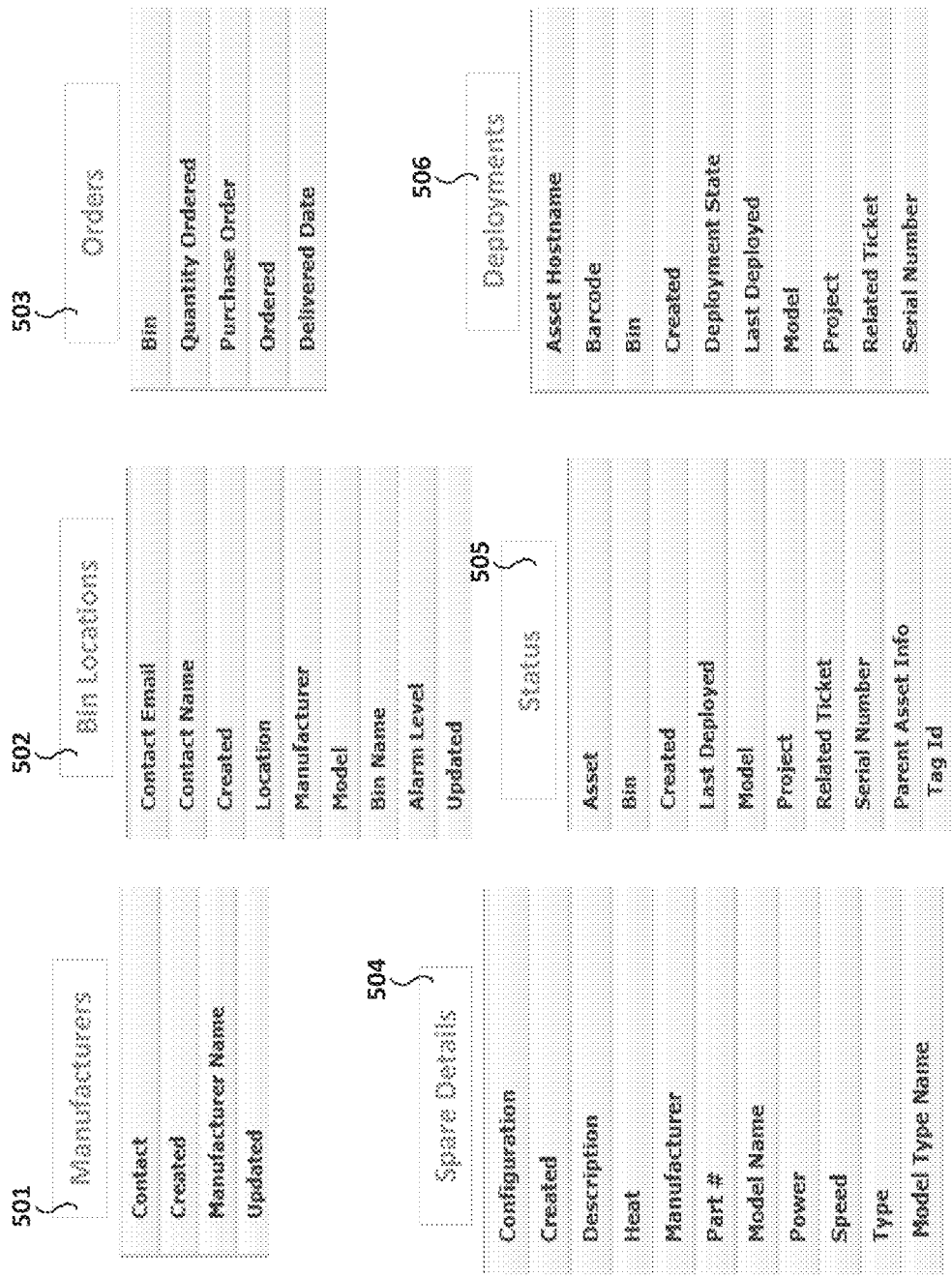
FIG. 5 shows a typical example of the data captured during the process defined in FIG. 2 as it relates to spares and the data necessary to provide a logical, semantic view of the relationships between spares, enclosures and related asset entities within a datacenter environment according to one embodiment.

FIG. 5 illustrates attribute groups. Some embodiments include a system that captures attribute information associated with spares, enclosures, related assets, and the support entities and any relationship information.

One or more of the following attribute groups may be supported: 501 Data concerning the manufacturer of a spare, the manufacturer name, contact name, created when the manufacturer was entered in the system together with any subsequent updates that were made; 504 Spare detail attributes including configuration, description, manufacturer, part number, model name, type and model type, heat output, power consumption and speed as appropriate; 502 Enclosure (Bin) Location attributes including the person responsible and contact details, created date, bin location, manufacturer, model, bin name, alarm level and last updated date as appropriate; 505 Spare Status attributes including asset association, bin, created date, last deployed, model, project, related ticket, serial number, parent asset information and RFID tag identifier as appropriate; 503 Spare Order attributes including enclosure (bin) associated, quantity ordered, purchase order number, ordered date and delivered date as appropriate; and 506 Spare Deployment attributes including asset host name, barcode, enclosure (bin), created date, deployment state, last deployed, model, project, related ticket and serial number as appropriate.

A semantic database is a hub that centralizes and models all information and brings spares into a unified intelligent infrastructure. The database is a hosted database accessed through a powerful web GUI dashboard that allows customers to manage, analyze, report on and spares. The database provides the business intelligence and knowledge based on which spares management, location and inventory management, order and deployment management and planning takes place. All spares information, their disposition, location, receipt, deployment and order data is captured by the database. Each Organization, Enclosure, and Spare, and support entities having attributes with associated measures specific to their industry. By way of example, a non-exhaustive example for a Spare would be configuration, power, speed, manufacturer, type.

The database allows users to intuitively manage spares usage, project and monitor new capacity simply and quickly. Stakeholders from across an organization including data center managers, facility managers, administrators and finance can access the critical information they need from the database eliminating the cost and expense of having multiple sources and the errors that inevitably result.

The system allows the definition and mapping of perimeter extents of an Enclosure through the Perimeter Interface Module. A non-exhaustive example of perimeter types include a datacenter room, a cage within a room, a bin within a cage or a rack in which spares are house and stored.

The system allows the unique identification of a spare. Unique identifiers in a datacenter example would be a spare's part number and in the case of high value spares, combined with the RFID Tag number and signal associated with that spare. The singularity or combination of these two attributes enables the system to associate, capture, monitor and timestamp data from other data sources that pertain to the spare within the system and ensures its accuracy and integrity.

Through the use of advanced, low cost local Radio Frequency Identification (RFID) tags, readers and scanners, the present invention provides a synchronized view between the system and the actual location of assets geospatially. The system then monitors spares provisioning, and tracks movement and deployment thereby reducing and in some cases eliminating the need for human intervention. It provides the ultimate in asset security and theft deterrence.

A comprehensive spares and event management Application Program Interface (API) preferably includes a set of API's to support integration of information from disparate sources pertaining to each individual spare. These API's support specifying products and the on-boarding of new spares, events and updates, detailed analysis whether historic or current and establishing relationships between people or projects and the spares in question and/or sharing information with colleagues or important 3rd parties. The ability to share information with other users/stakeholders delivers to each broad access to important data that would otherwise be unavailable or require users to manually intervene with disparate sources/applications to access the data. The system provides the automation and delivery of an information sharing paradigm through API's into unified Graphical User Interface. API's also provide the ability to obtain aggregate, statistical and individual reporting data, including, but not limited to the type, number, on order, in stock, cost, location and disposition information about spares.

The present invention has the ability to analyze and make decisions based on the integration of facts concerning every aspect of a spare and use of tools provided to support and validate such decisions.

All spares have logistical implications, cost to maintain, cost to replace, costs to stock and end of lifecycle. In particular it is important to know and plan when stocks need to be replenished to ensure smooth operations. An embodiment of the system provides capabilities for assessing stock levels and issuing alerts that are triggered when stock levels of a particular spare falls below pre-defined thresholds and lets key users know when such important events take place.

Information about spares is made available through the system infrastructure, optionally using a GUI. This information may be available to users via standard reports or the "user defined" report building capability for the purposes of managing the effectiveness of spares including their cost to maintain, usability, security, viability end of life and replenishment strategy.

The Spares Manage Capability

A Spares Manage UI allows a user to see spares and create, populate add, change, delete, existing or new manufacturers, models, model types, spares deployment, enclosures (bins) and orders manually. Spares Manage further allows a user to view, filter, search, select and analyze any aspect of the system. Within Spares Manage a user can see in detail attributes of spares, their status and disposition.

Figure 6:
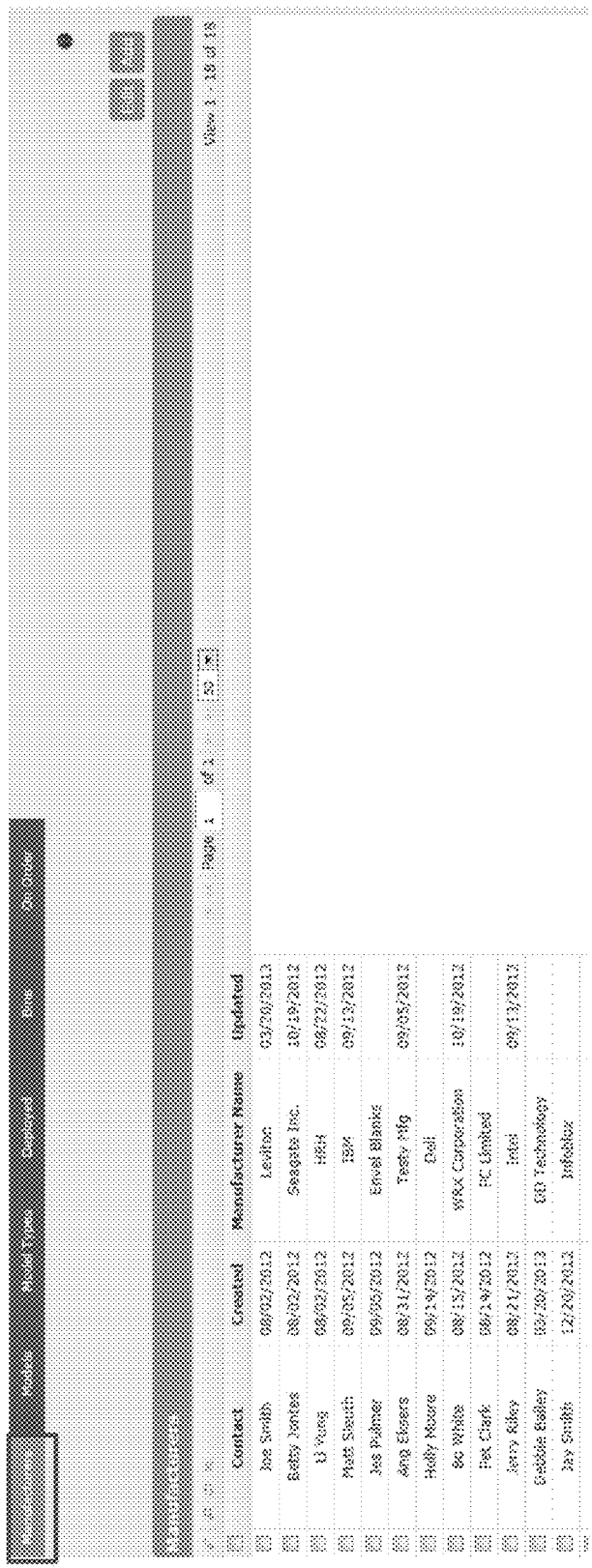

By way of example, FIG. 6 shows the initial Manage interface specific to spares manufacturers and the typical types of data being captured. Data includes the manufacturers name and contact information. It further includes dates of creation in the system and last change (update).

By way of further example, FIG. 7 shows the Model interface specific to the model of spares in the system and the typical types of data being captured. Data includes minimally configuration details, description, manufacturer part number, model name and power consumption. It further includes dates of creation in the system and last change (update).

Figure 8:
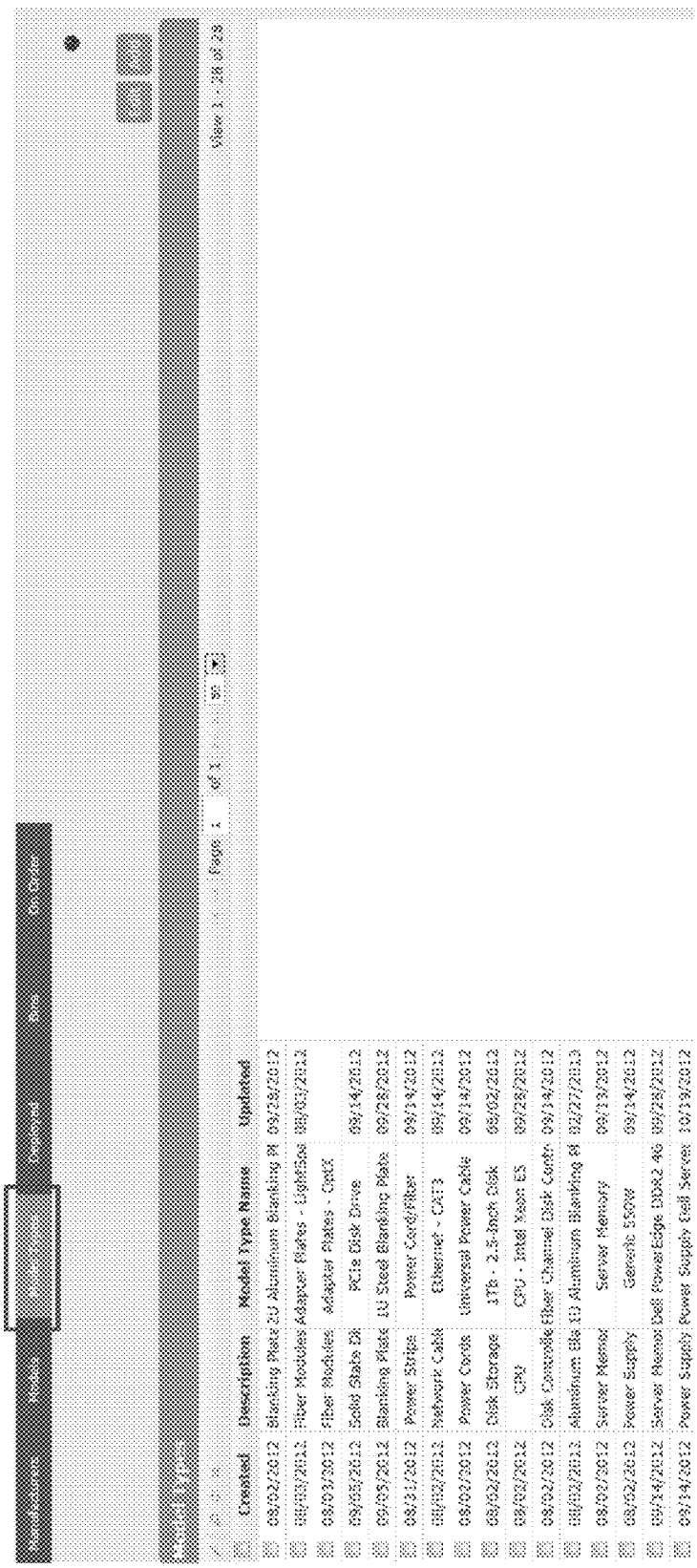

By way of further example, FIG. 8 shows the Model Types interface specific to the model of spares in the system and the typical types of data being captured. Data includes minimally a model type description and name. It further includes dates of creation in the system and last change (update)

Figure 9:
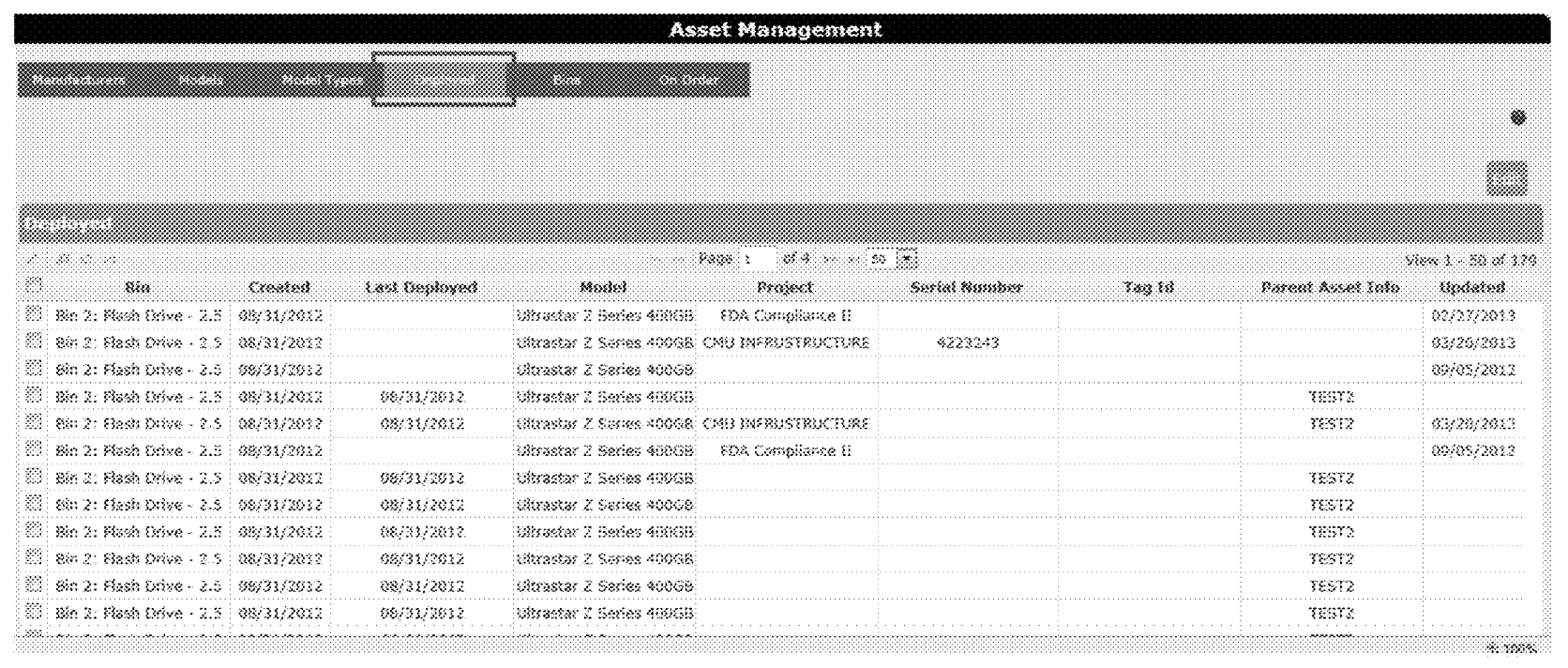

By way of further example, FIG. 9 shows the Deployed interface for spares in the system and the typical types of data being captured. Data includes minimally the bin from which the spare was issued, the model type description, which project it is assigned to, the asset serial number to which the spare has been assigned, a tag ID if any and information concerning the parent asset. It further includes dates of creation in the system and last deployed and last changed (update).

Figure 10:
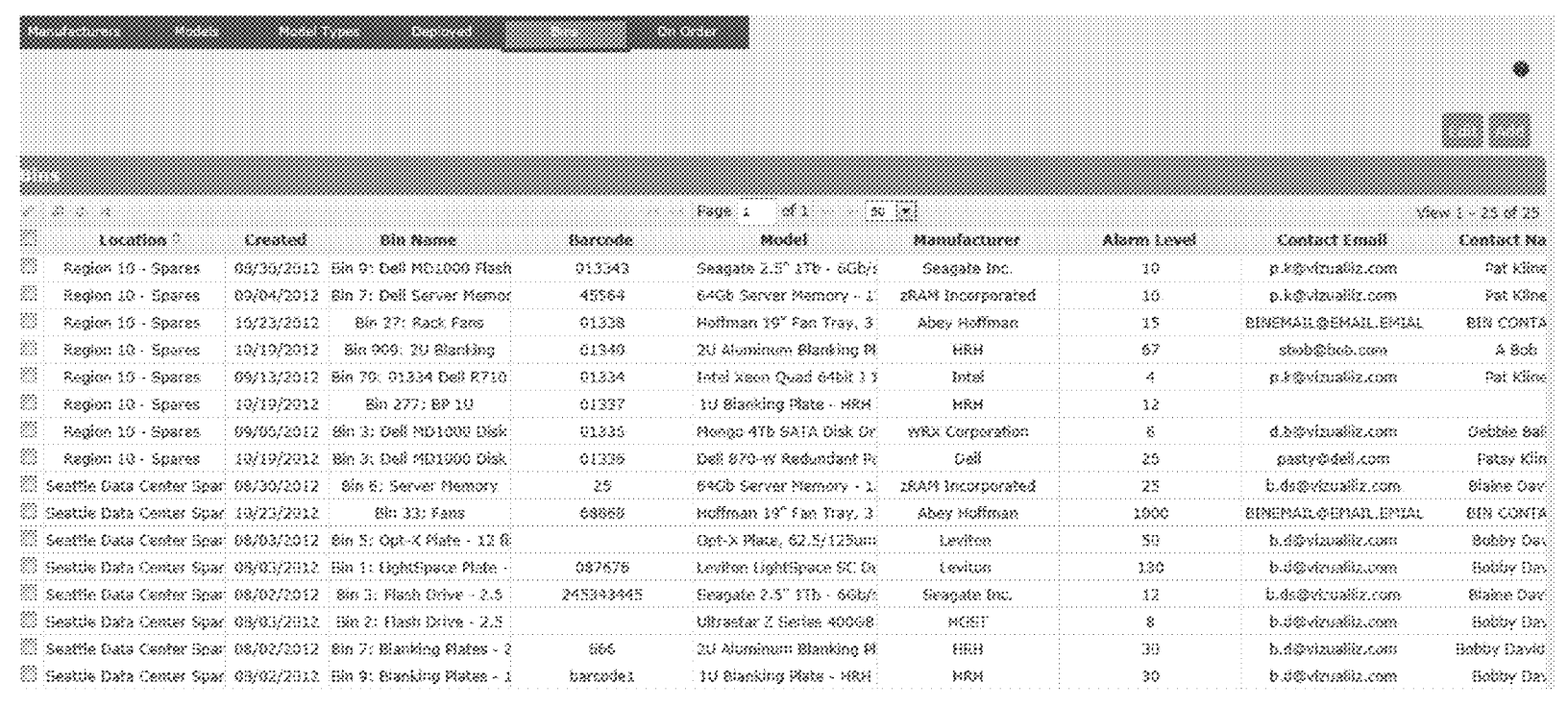

By way of further example, FIG. 10 shows the Enclosure (Bin) interface for spares in the system and the typical types of data being captured. Data includes minimally the bin's location, bin name, bin barcode, spares models contained within the bin, spare manufacturer name, alarm level, contact name and email. It further includes dates of bin creation in the system.

By way of further example, FIG. 11 shows the spares On Order interface in the system and the typical types of data being captured. Data includes minimally the bin name for which an order was placed, quantity ordered, purchase order number, ordered date, quantity delivered (if any) and date of delivery and if an order was subsequently cancelled the cancellation date.

3D Visualization

Figure 12:
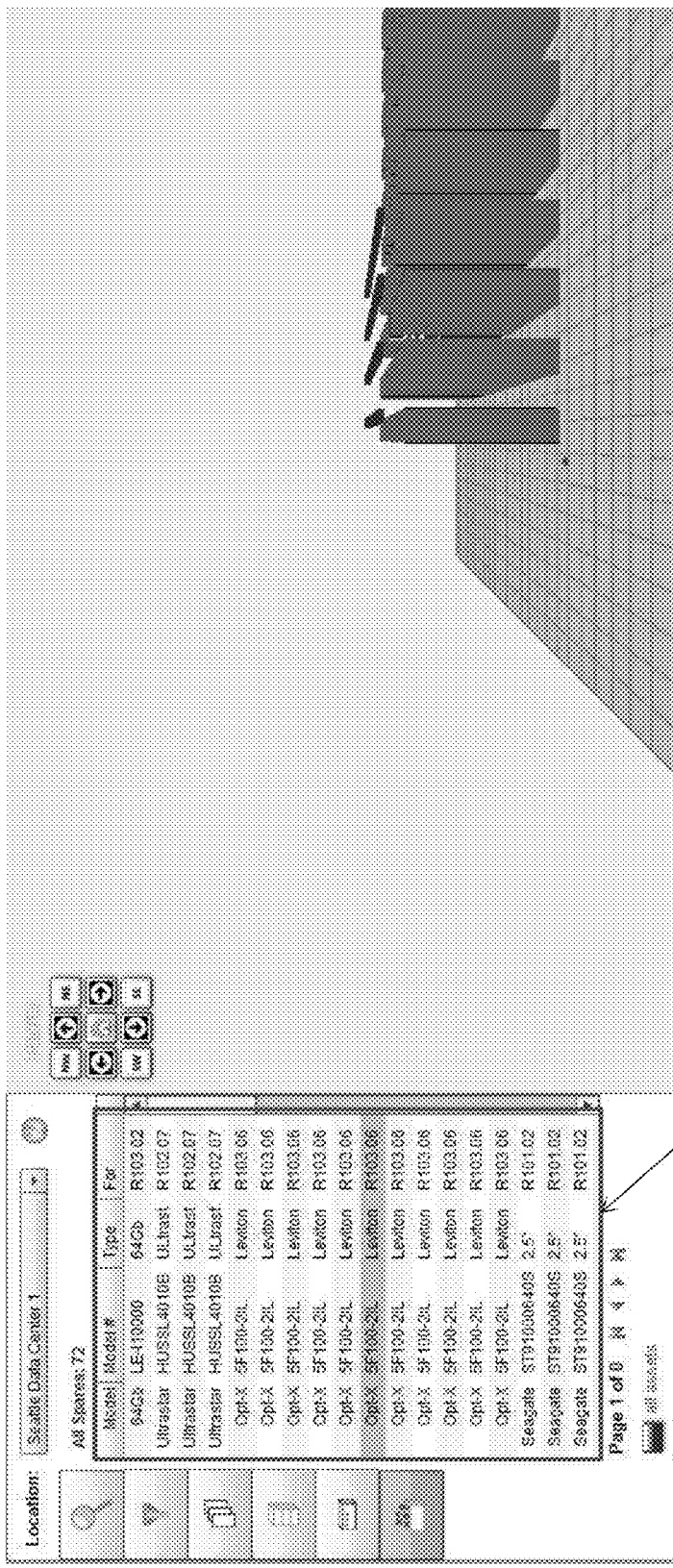
FIGS. 12 and 13 illustrate a 3D visualization component provided by an example embodiment.

Some embodiments include a 3-Dimensional (3D) Visualization component that provides a 3D visualization, navigation and reporting of all spares and the assets to which they are now associated. By way of example, FIG. 12 shows the spares deployed within a particular location. The 3D Visualization component automates the monitoring, analysis and interrogation of spares and is accessed through a powerful web graphical user interface (GUI) dashboard.

Figure 13:
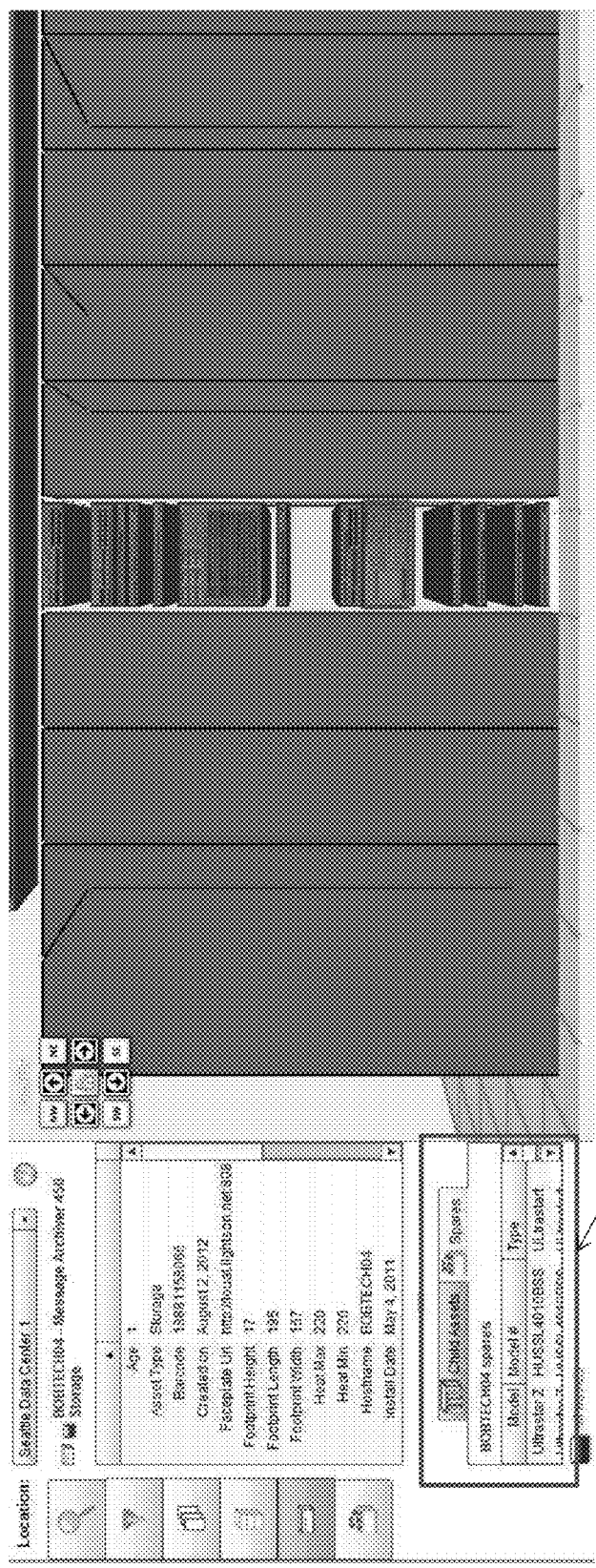

Using the 3D Visualization component a user can select a spare that is of interest. FIG. 13 illustrates how the system provides an Asset Halo Glow Identifier maps and highlights the asset hosting the spare selected and allows the visual differentiation between selected and non-selected assets. The user can click the asset and see detailed information about the spare and any other spares that are hosted by the asset.

Spares Dashboards

Figure 14:
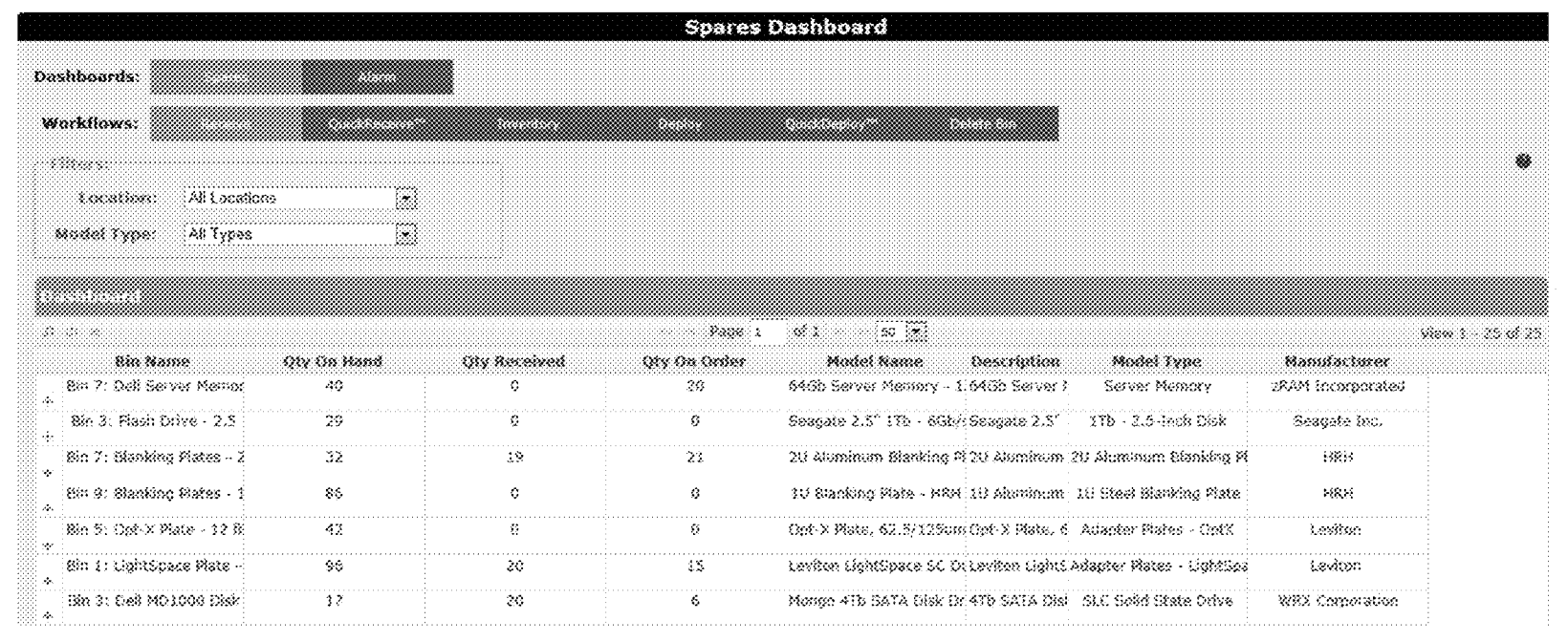

FIG. 14 shows the Spares Dashboards user interface according to an embodiment of the invention. A Spares Dashboard UI allows a user to select from any of the data dimensions, properties or measures needed for any enquiry. The selectable properties include filters for location and/or spares model type. Users can also filter on the data they wish displayed in columns and drag columns to reorder the view. Users can further search for, filter and sort data. Any multiple of these can be selected by a user.

Figure 15:
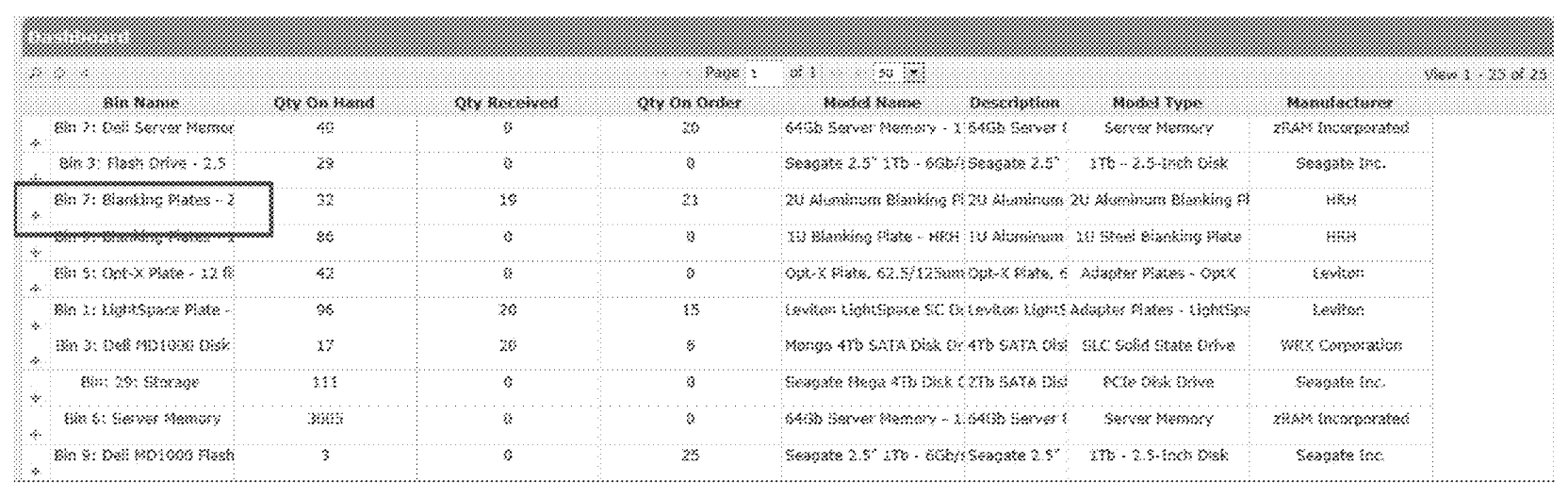
Figure 16:
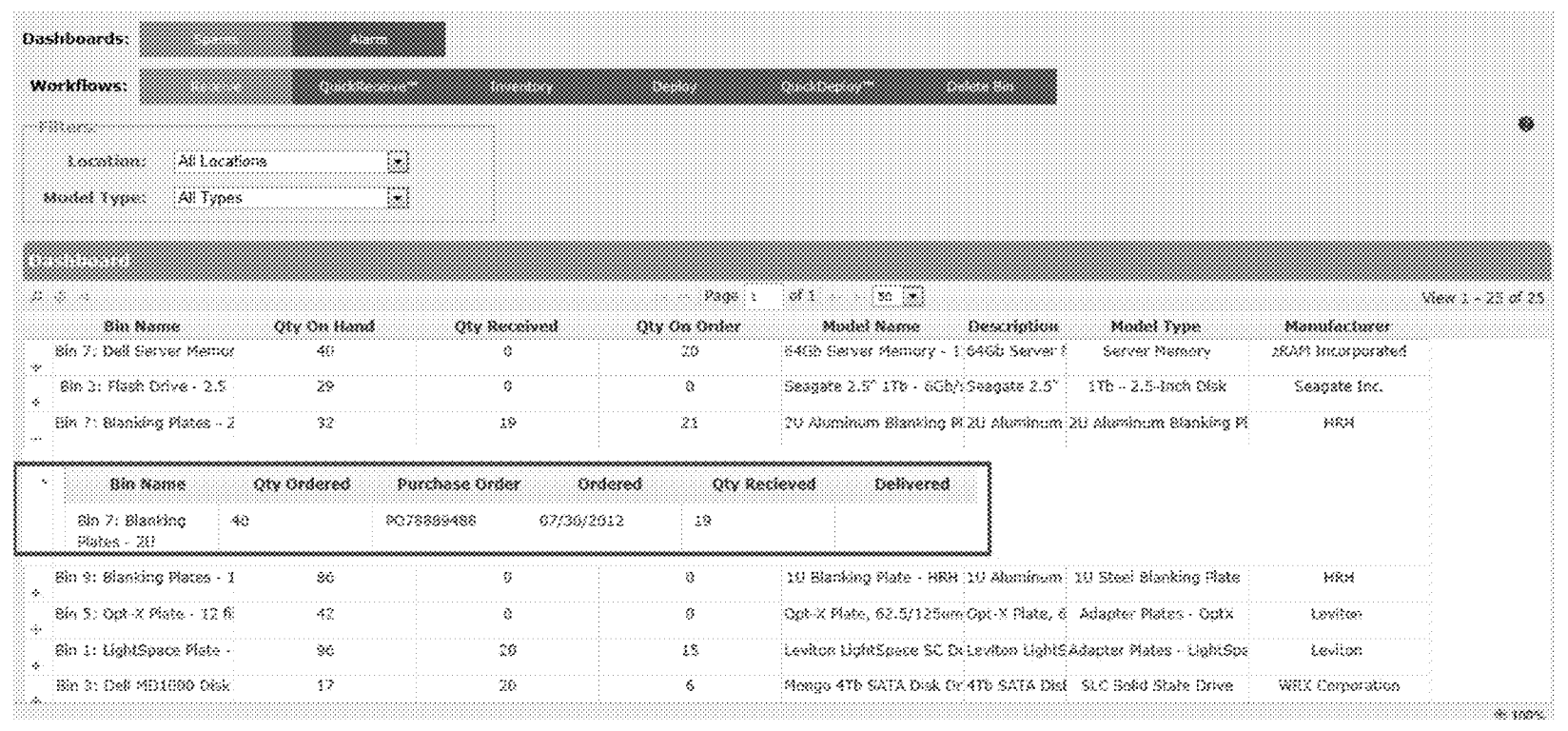

Within the Spares Dashboard, an embodiment of the invention is a capability for quick data access of on order and receipt information for spares relating to an Enclosure (Bin). By way of example, FIG. 15 highlights a particular Bin for which further investigation is needed. By clicking the "+" sign adjacent to the Bin Name a pop up screen is provided highlighting any and all details pertaining to orders and receipts for that bin location. See FIG. 16.

Workflows

An embodiment of the invention is a system that provides pre-built workflows for the in-bound receiving of spares, inventory management and audit of spares and the deployment of spares. The pre-built workflows are designed to direct the user to perform tasks in a logical, optimized way and through the integration with other data sources made available by the system through a graphical user interface and provide automated data entry to dramatically reduce the need for human effort through this interface. All information captured during the workflow processes update the central relational database of the system.

Figure 17:
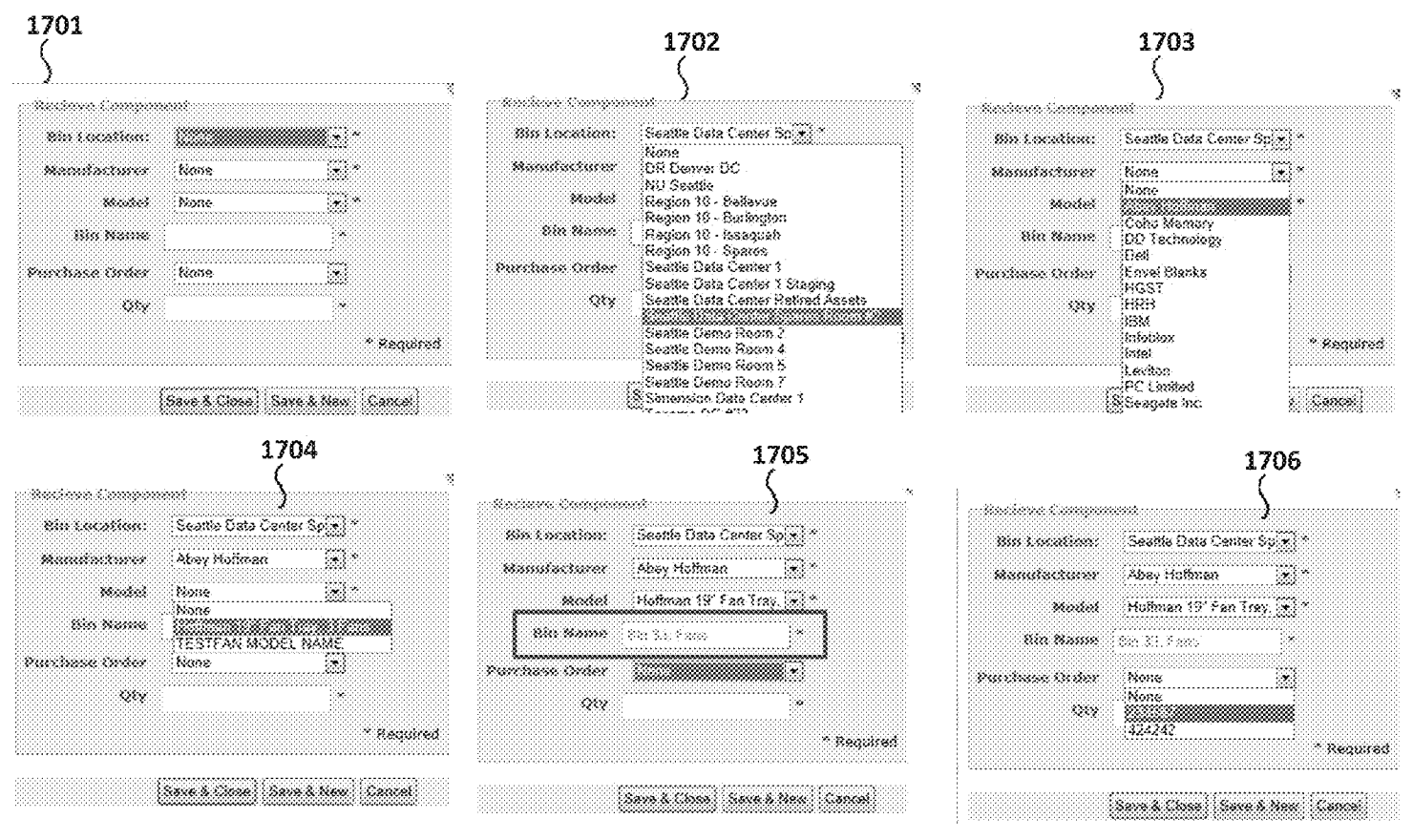

Some embodiments provide a Receive Workflow. FIG. 17 provides an illustrative example of the system and process. The system provides a user with a simple flow of information to be captured when receiving spares 1701. The user selects the location in which the spare is being received. The system provides a drop down list of all locations within the system for ease of selection 1702. The system further provides for the manufacturer of the spare to be selected from a dropdown list 1703. The system further provides for the model type of the spare to be selected from a dropdown list 1704, filtered based on previous selections. The system further automatically identifies and enters the enclosure (bin name) for the spare based on previous selections 1705. The system further provides for the purchase order number to be selected from a dropdown list 1706, filtered based on previous selections. The user may also provide the number of spares that have been received and placed into the enclosure (bin).

Another embodiment provides a Quick Receive Workflow. FIG. 18 provides an illustrative example of the system and process. The system provides a user with a quick, alternative means of receiving spares. This simple flow requires an enclosure (bin) to have its barcode scanned by a reader connected to the device to capture enclosure information. This captures bin location information, manufacturer, model and bin name, and allows spares to be numerically entered into the system at the time of their physical placement.

Figure 19:
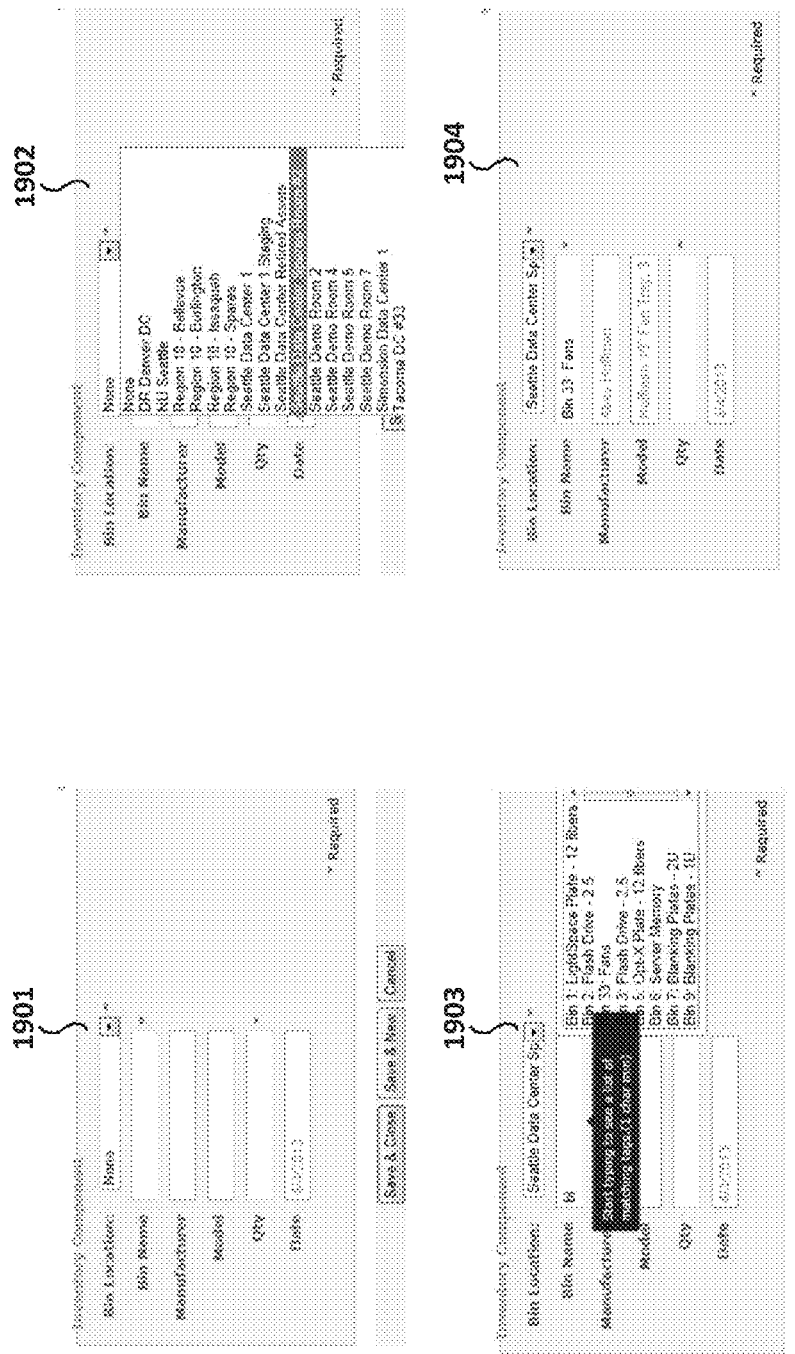

Another embodiment provides an Inventory Workflow. FIG. 19 provides an illustrative example of the system and process. The system provides a user with a simple flow of information to be captured when auditing or inventorying spares within a particular enclosure (bin) 1901. The user selects the location in which the spares are to be inventoried. The system provides a drop down list of all locations within the system for ease of selection 1902. The system further provides for the selection of the enclosure (bin) name 1903. As the user enters the first digits of the bin name the system automatically delivers a pop up view of matching records for the user to select from. The system further provides automatically the manufacturer, model type and inventory date leaving the user to only have to enter the physical quantity on hand 1904.

Figure 20:
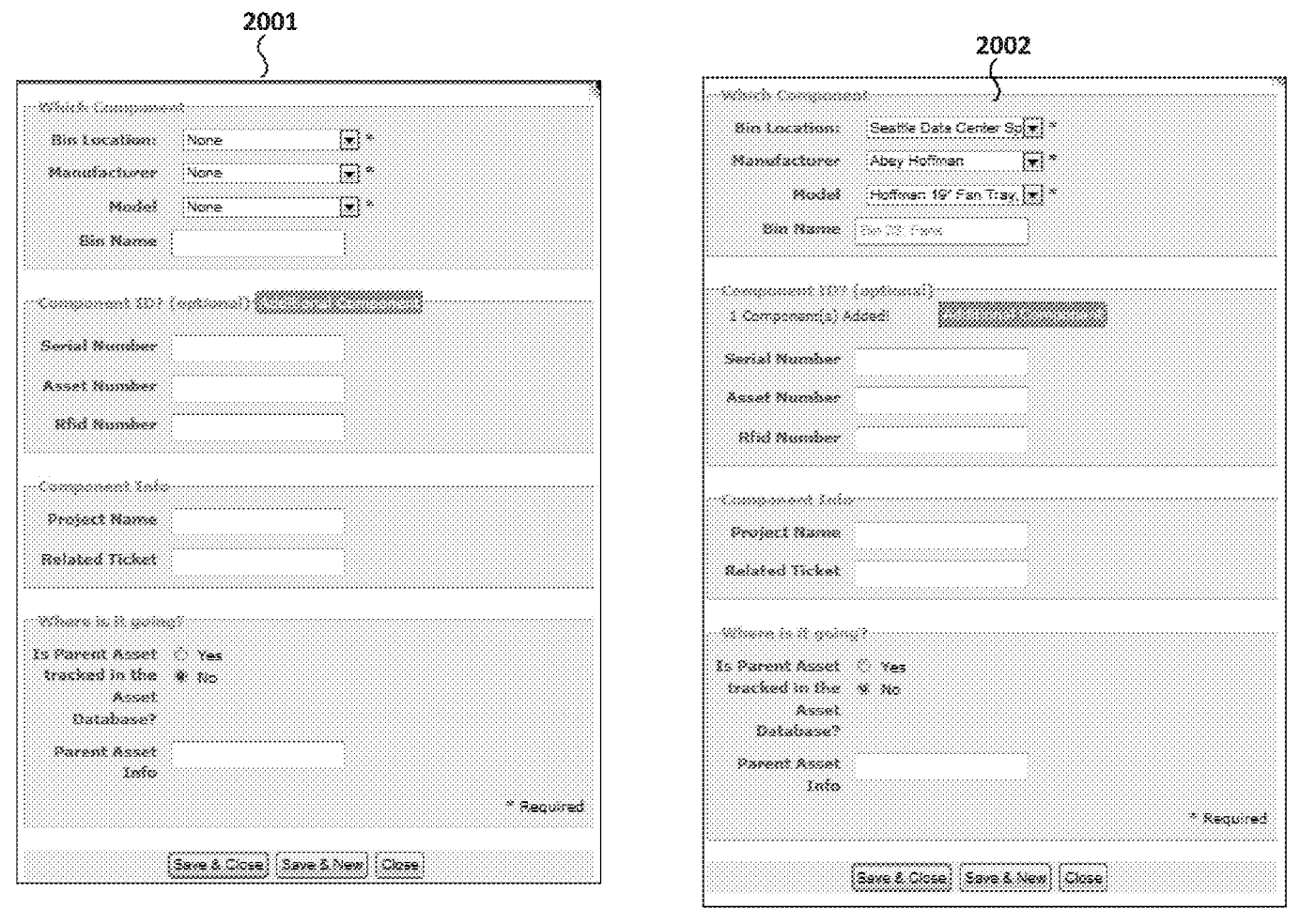

Another embodiment provides a Standard Deploy Workflow for spares when spares are removed from enclosures and applied to physical assets. FIG. 20 provides an illustrative example of the system and process. The system provides a user with a simple flow of information to be captured when deploying spares from a particular enclosure (bin) 2001. The user selects the bin location, the manufacturer, spares model data for the spare being deployed using filtered pop up dialogues boxes for each 2002. The system automatically associates and provides the bin name for the use.

The system further provides for the manual or automated data capture of optional component information pertaining to the parent asset to which the spare is being associated including asset serial number, asset number and Radio Frequency Identification (RFID) number (if available). The system further automatically provides for or the user can manually enter component information pertaining to the project name against which the parent asset is used, and the related ticket that invoke the spare to be deployed. The system further automatically provides for or the user can manually enter whether the parent asset is currently tracked in the system's relational database or not and add any relevant information.

Figure 21:
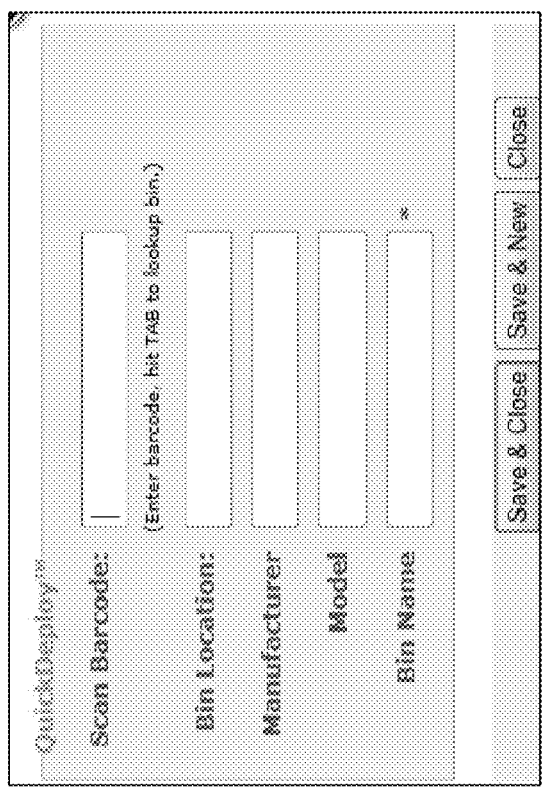

Another embodiment provides a Quick Deploy Workflow. FIG. 21 provides an illustrative example of the system and process. The system provides a user with a quick, alternative means of deploying spares. This simple flow requires an enclosure (bin) to have its barcode scanned by a reader connected to the device to capture enclosure information. This captures bin location information, manufacturer, model and bin name, and allows spares to be numerically entered into the system at the time of their physical deployment.

Figure 22:
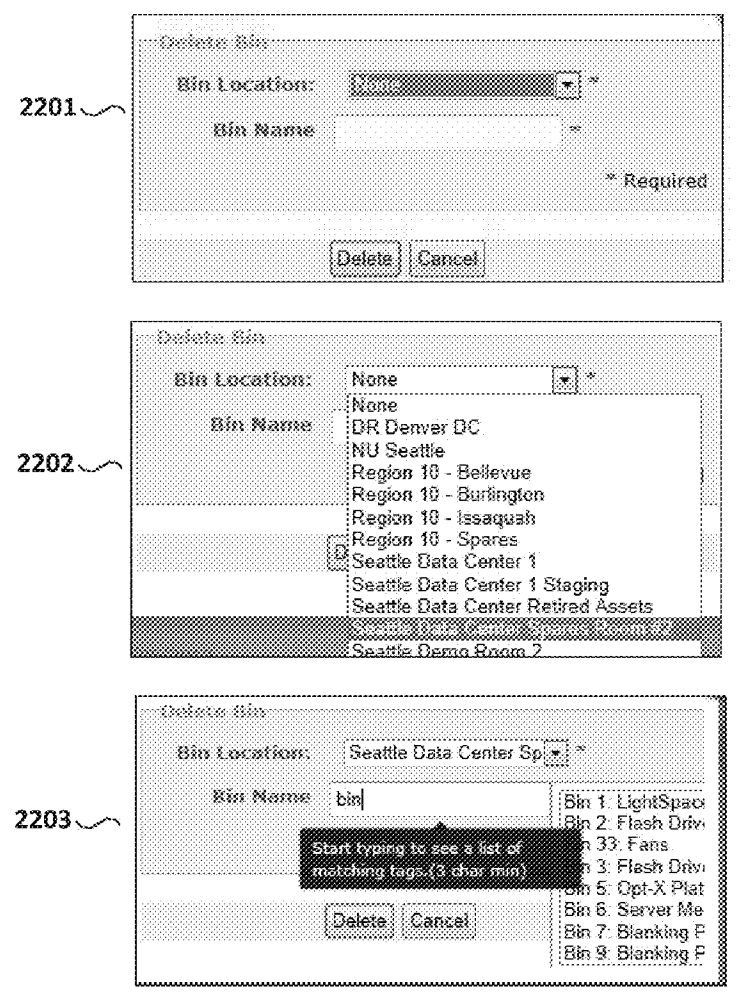

Another embodiment provides a Delete Enclosure (Bin) Workflow. FIG. 22 provides an illustrative example of the system and process. The system provides a user with a logical process for deleting information from the system concerning and enclosure that no longer exists 2201. The user first selects the enclosure location from a drop down list provided by the system 2202. The system further provides for the selection of the enclosure (bin) name 2203. As the user enters the first digits of the bin name the system automatically auto fills a view of matching records for the user to select from. Once correctly selected the user choses the delete option to remove the enclosure (bin) from the system.

Multi-Site Spares Management and Alarms

Effective spares management requires monitoring of stated replenishment levels. As noted above, some embodiments track inventory levels and can be configured to raise alarms when inventory drops lower than a particular threshold level. In short, when a type of spare gets to a certain inventory level, action is required. Some embodiments apply these alarm techniques to multiple data centers. By managing the spares equipment on a global basis the option of transferring spare types from one datacenter to another is an effective mechanism. This alleviates additional purchases and equalizes inventory levels throughout the "global system." Of course, when the overall "global system" inventory is reduced to an undesirable level, additional purchases will be required. To effectively manage the "system" of inventories a global dashboard is required that reflects spares types in "alarm" inventory levels. Critical to this endeavor is the understanding of consumption rates of the various spare types to intelligently associate each spare type with the appropriate "alarm" quantity level. Further, being able to associate known purchase orders with each spare type adds to the overall effectiveness of spares management.

Figure 23:
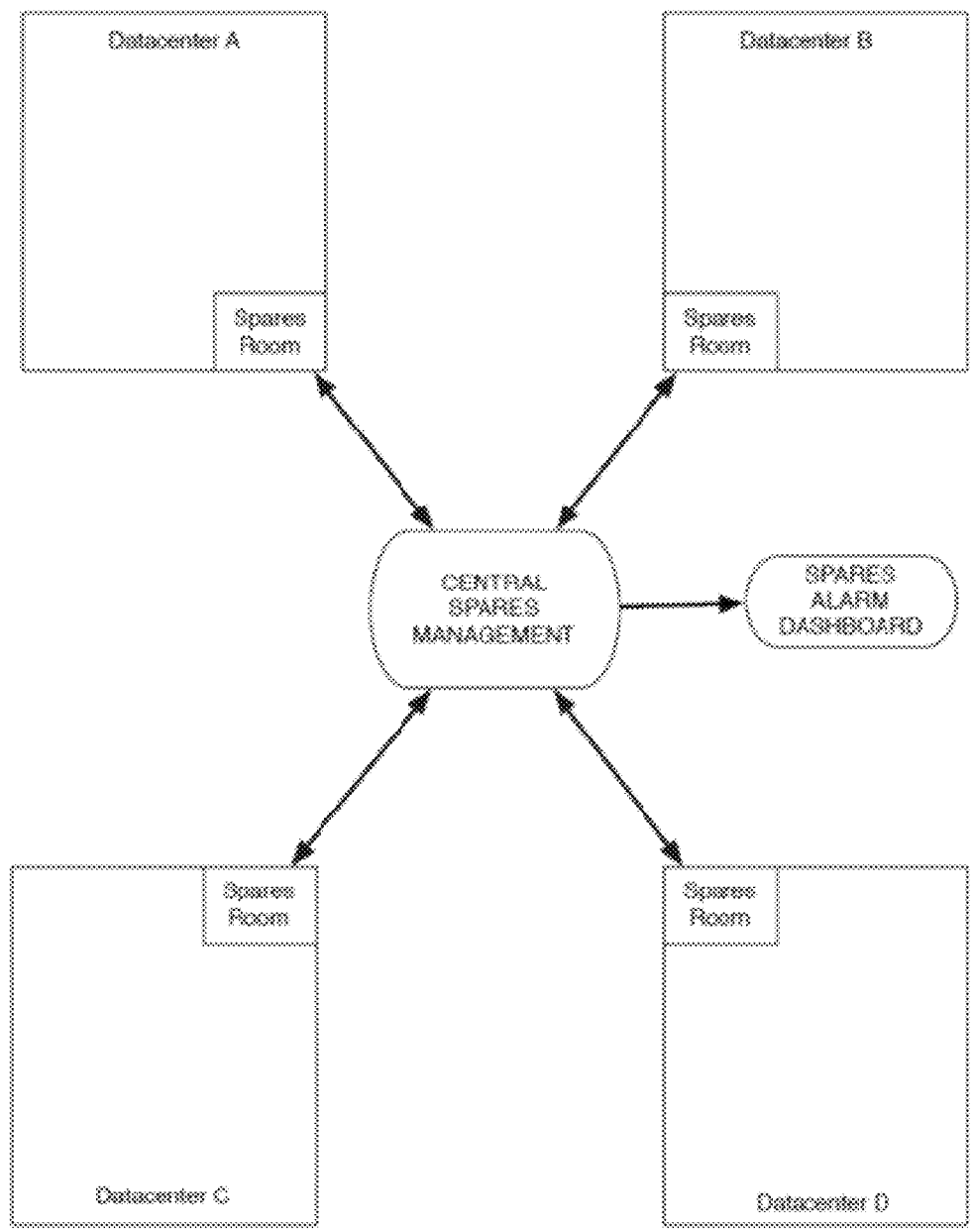
FIG. 23 is a block diagram illustrating spares management across multiple data centers.
Figure 24:
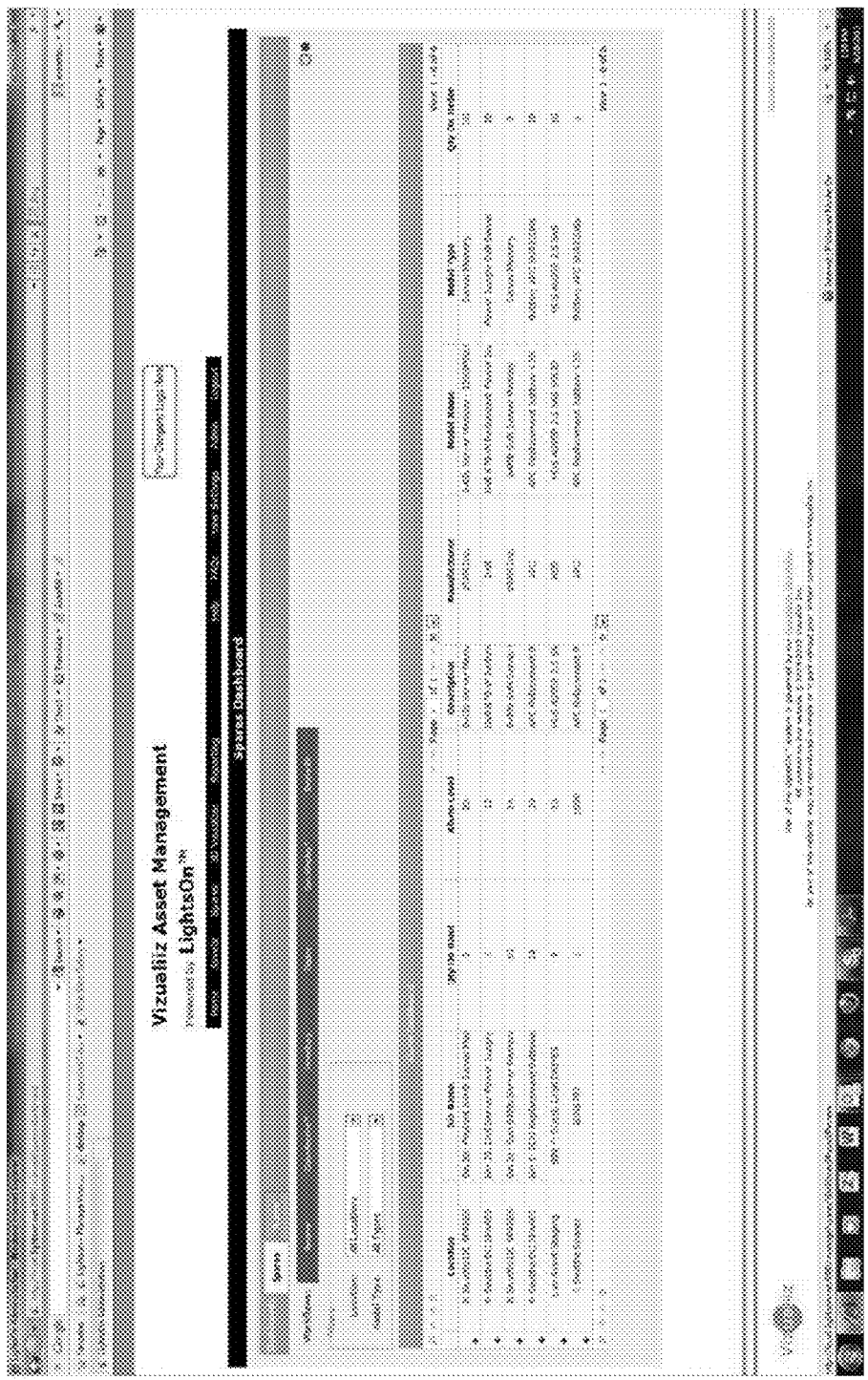
FIG. 24 is a user interface for spares management provided by an example embodiment.

FIG. 23 is a block diagram illustrating spares management across multiple data centers. FIG. 24 is a user interface for spares management provided by an example embodiment. In embodiments that manage spares across multiple data centers, a centralized spares management and tracking module receives information from multiple spares rooms each located in a distinct data center. The spares management module tracks the inventory levels and generates and transmits alarms when levels drop below specified levels. Transmitting an alarm may include notifying designated users and instructing them to take remedial action, such as transferring inventory from one data center to another, ordering additional inventory, reconfiguring systems to adapt to an impending parts shortage, salvaging parts from non-operational systems, or the like. Notifying a user may include transmitting a message (e.g., a text message, an email), updating a user interface screen (e.g., console or Web page), or the like.

The management module may also or instead perform automatic balancing of inventory levels, such as by initiating the transfer of spares from one spares room to another. Balancing may be driven by or based on "balancing rules," which may include various criteria, properties, rules, or requirements, such as a requirement to keep at least a specified minimum number of spares at each location, a requirement that no more than a specified maximum number of spares reside at a particular location, a requirement to balance the distribution of spares substantially evenly across locations (e.g., so that each location has no less than half the average number and no more than double the average number), a requirement that no location has more than a specified number of spares than any other location, a requirement to minimize shipping or transfer costs, and the like.

Balancing rules may also include corresponding actions that are triggered when the rule is matched. For example, when a low level is detected in a first data center, the rule may trigger the automatic transfer of one or more spares from a second data center, where the second data center is the data center having the largest quantity of spares on hand. As another example, when a globally low level is detected across multiple data centers, the rule may trigger the automatic purchase of one or more spares from a supplier. Actions may take into consideration various factors, such as transportation cost/distance/time (e.g., to obtain spares from the nearest data center), in order to optimize or at least reduce the overall cost or time-efficiency of balancing spares between data centers.

The balancing rules may be specified by a user via a user interface screen. For example, the user may select different rule types (e.g., global thresholds, local thresholds) and/or set different levels (e.g., minimum total level, minimum data center level). The user may also control how different rules interact with one another. In some embodiments, the user may specify logical relationships (e.g., and, or, not) that should apply within or between rules. For example, the user may specify that both a first and a second rule should be applied, that a first or a second rule should be applied, that some rule or condition should not apply, or the like. In some embodiments, the user may specify precedence that should apply between rules, such as an order in which rules are to be applied or enforced.

Ontology and Semantic Relationships

Figure 25:
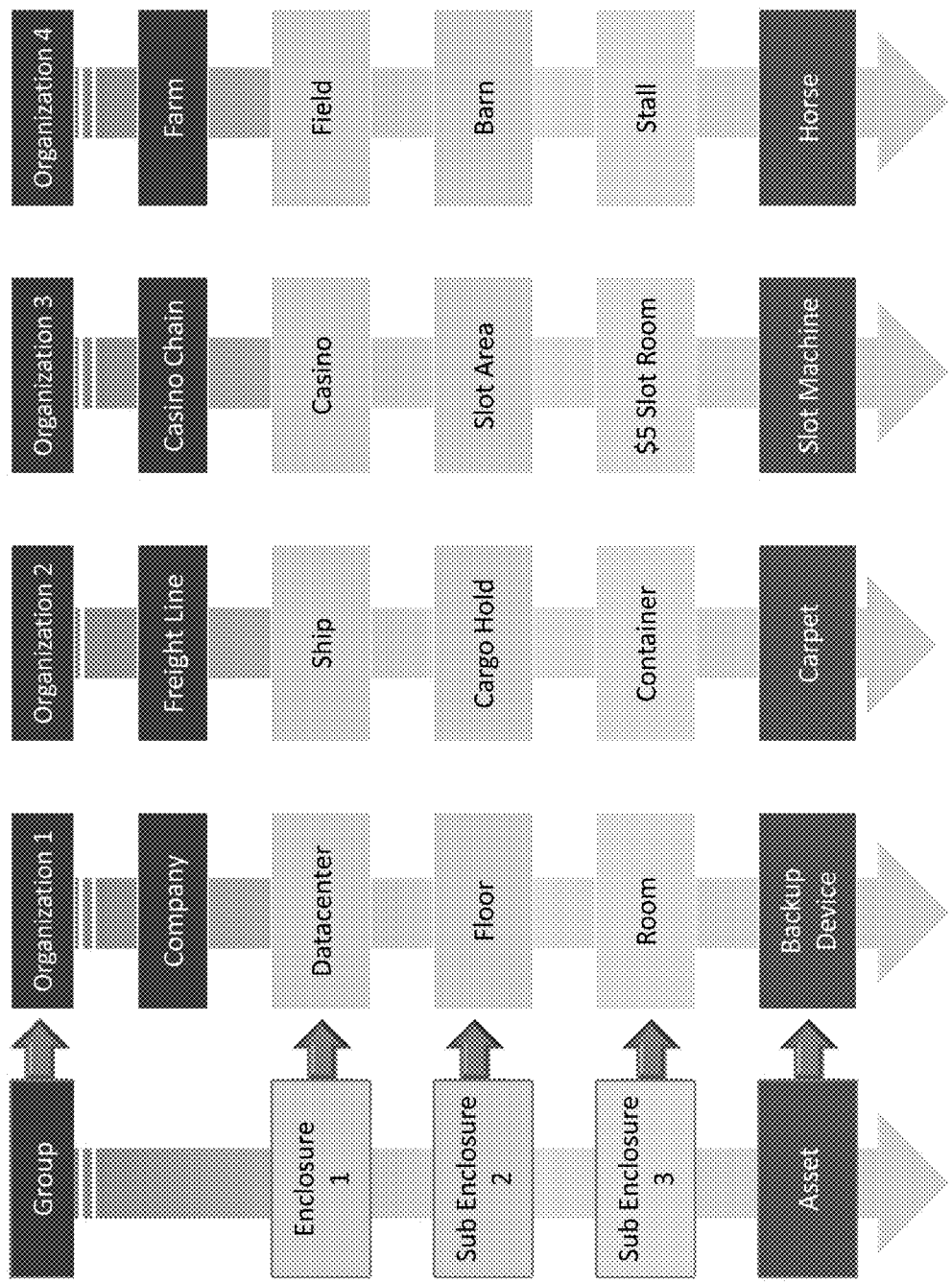
FIG. 25 illustrates example ontologies supported by various embodiments.

FIG. 25 illustrates example ontologies supported by various embodiments. Depending on the particular industry or context, the system is capable of defining arbitrarily nestable and classifiable entities, which represent purely semantic relationships. By modeling different contexts in this manner, the described techniques can represent information in an industry-specific manner. There are three primary entity types:

1. Groups: Logical groupings of other groups/enclosures i.e. Division, Company, etc such as "Organization" e.g. a company, a farm, a freight liner or a casino 2. Enclosures: A Group with 'extent', and other attributes. A system capable of defining arbitrarily nestable and classifiable Enclosures, which include both a semantic label, and an extent, a position, and a physical orientation in space relative to its parent or some global coordinate system. Represent organizational units that have a physical presence of some kind. These can be classified arbitrarily, "Server Room", "Datacenter", "Container". They can be associated with users, projects or contracts. They can have other Enclosures or Assets as children. By way of example Enclosures:

Can be used to model a Datacenter, with an Enclosure root node labeled as "Building", and given a extent modeling the building volume, and its position in latitude and longitude. This has sub-enclosures such as "Floor" and "Room", each with its own size, and position relative to the parent using the Perimeter Mapping Module.

Can be used to model any enclosures within any organization. In the case of a farm, enclosure examples include Field with sub-enclosure Barn with subenclosure Stall using the Perimeter Mapping Module.

Can then be associated with any applicable Group that own(s) them.

3. Assets: Physical items with physical presence, physical traits and measurable attributes (Weight, Temperature, Size, Age, Value) and can be classified arbitrarily, such as "Computer Server", "Horse", "Painting". All Assets can contain sub-asset classes.

Figure 26:
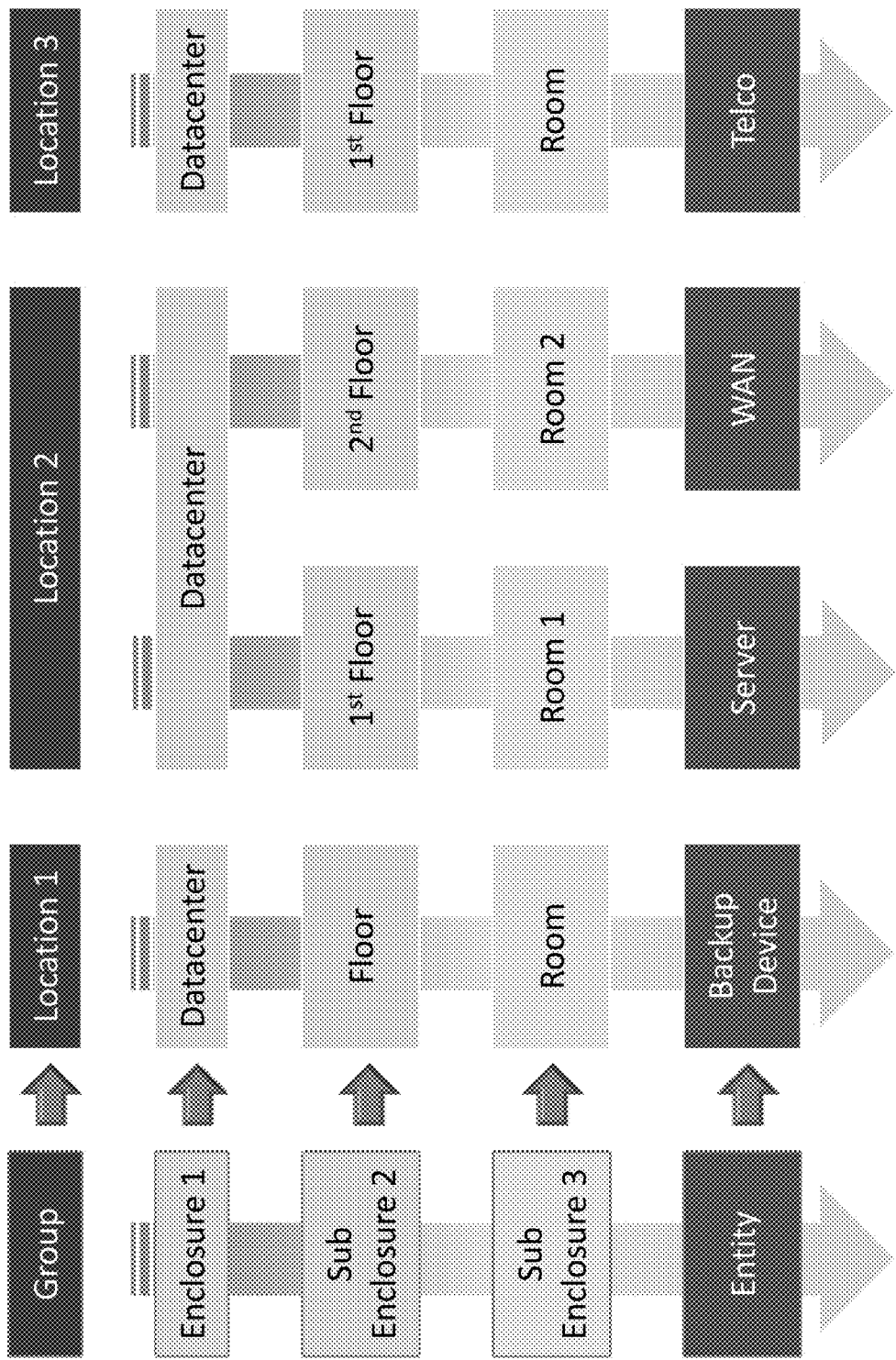
FIG. 26 illustrates an ontology according to an embodiment of the invention as it specifically relates to the data center context.

FIG. 26 illustrates an ontology according to an embodiment of the invention as it specifically relates to the data center context. In this embodiment, the system is capable of defining arbitrarily nestable and classifiable entities such as locations, buildings, floors and machine rooms.

Furthermore, for each area of applicability, Application Specific Entities can be added with their own attributes, which are then associated with an enclosure that contains them. For example, computer equipment as Asset entities can be associated with the Enclosure modeling a datacenter room Enclosure on a particular floor Enclosure.

Figure 27:
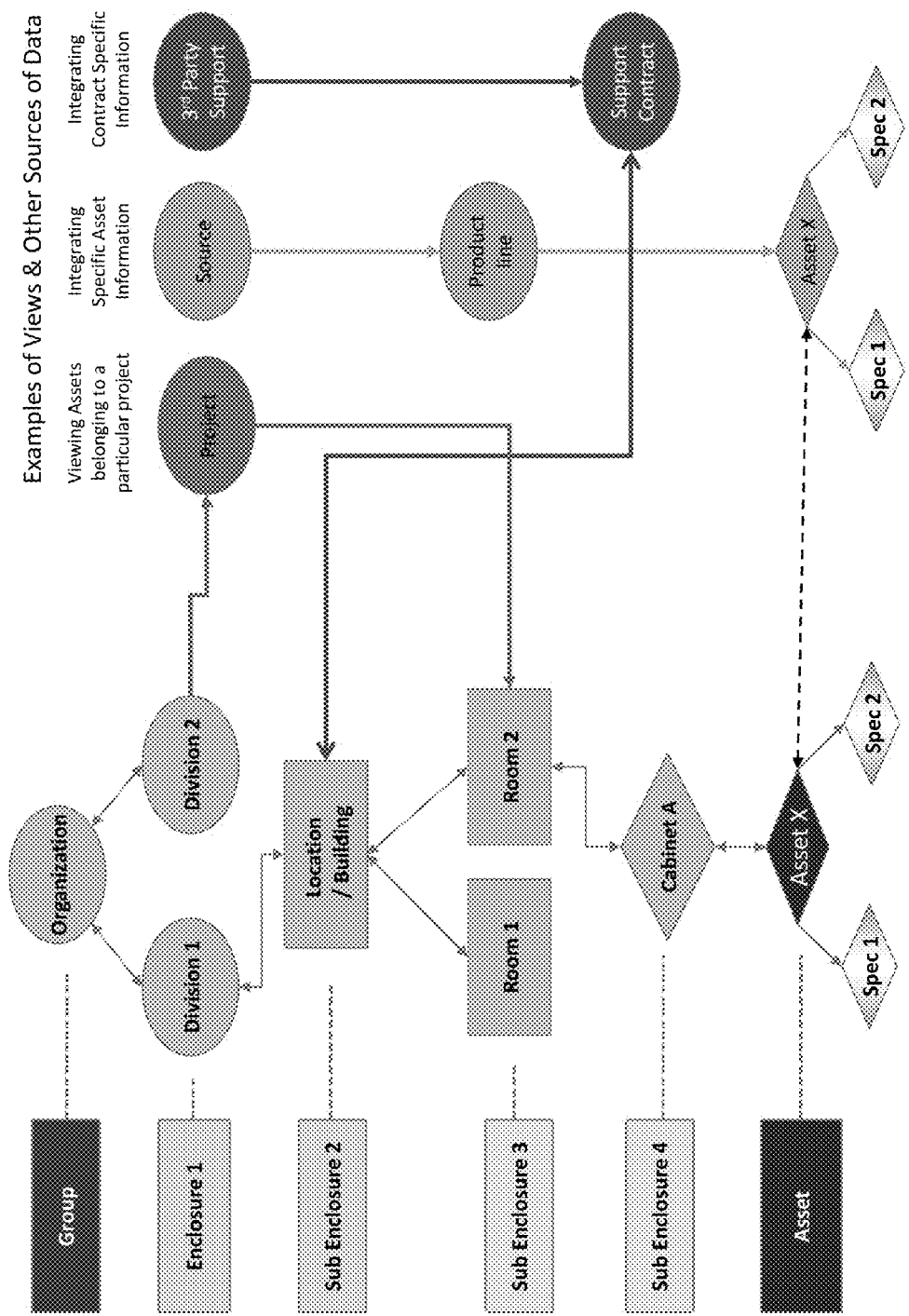
FIG. 27 illustrates example semantic relationships according to one embodiment.

FIG. 27 illustrates example semantic relationships according to one embodiment. The illustrated embodiment allows other objects, groups and their separate trees/graphs to be further added to model other special purpose objects, semantic groupings and their interrelationships to existing objects to model and manage the inter-relationships between Groups.

These may be for example in a datacenter scenario: a "Contract" object that can be used to denote the support relationship between a separate Organization providing maintenance services; Groups and Assets/Enclosures encapsulating a cross-department or multi-company project; and a "Source" that is the originating organization of the asset facilitating the capture of specific information pertaining to an Asset.

All of the above-cited references, U.S. Provisional Application Ser. No. 61/842,883, entitled "ASSET MANAGEMENT SYSTEMS, METHODS, AND DEVICES," and filed Jul. 3, 2013, are incorporated herein by reference in their entirety. Where a definition or use of a term in an incorporated reference is inconsistent or contrary to the definition of that term provided herein, the definition of that term provided herein governs and the definition of that term in the reference does not apply.

While example embodiments of the invention have been illustrated and described, as noted above, many changes can be made without departing from the spirit and scope of the invention. Accordingly, the scope of the invention is not limited by the disclosure of any particular embodiment. Instead, the invention should be determined entirely by reference to the claims that follow.

The invention claimed is:

1. A system for semantically managing relationships and dependencies between spares, enclosures and support entities according to an industry specific manner, the system comprising:
   a user interface device comprising a user input device and a display device;
   a relational database; and
   a processor in data communication with the database and the user interface device, the processor executing a spares management module that:
      captures relationship and dependency information between spares, enclosures and support entities for an organization from the user interface device;
      receives attributes with associated measurements for the spares, enclosures and support entities for the organization from the user interface device, wherein the attributes with associated measurements are formatted according the specific industry of the organization, the attributes including for each type of spare an associated quantity;
      stores the relationship and dependency information and the attributes with associated measurements into the relational database;
      generates and transmits an alarm when the quantity of one type of spare falls below a threshold level; and
      automatically balance spares quantities across multiple data centers by:
         specifying, via the user interface device, multiple balancing rules, the multiple balancing rules selected from a first rule that specifies that at least a minimum quantity of spares be present in each of the multiple data centers, a second rule that specifies that no more than a maximum quantity of spares be present in each of the multiple data centers, and a third rule that specifies that spares be distributed substantially evenly across the multiple data centers, and a fourth rule that specifies a minimum total quantity of spares across all of the data centers, wherein each of the multiple balancing rules includes a corresponding action that is triggered when the rule is matched;
         specifying, via the user interface device, logical relationships and precedence between the multiple balancing rules, wherein the logical relationships include logical operators including "and," "or," or "not" that are applied between the multiple balancing rules, wherein the specified precedence includes an order in which the multiple balancing rules are to be applied;
         monitoring spares quantities across the multiple data centers; and
         initiating transfer of spares from a second one of the multiple data centers to the first data center, wherein the transferred spares are physical assets, wherein the transfer is based on the multiple balancing rules, the logical relationships and precedence between the multiple balancing rules, and the monitored spares quantities.

2. The system of claim 1, wherein the spares management module,
   when the quantity of one type of spare falls below a threshold level at a first one of the multiple data centers, initiates transfer of spares from the second one of the multiple data centers to the first data center.

3. The system of claim 1, wherein the spares management module transmits the alarm by notifying designated users and instructing them to take remedial action.

4. The system of claim 1, further comprising a plurality of data Application Program Interfaces (APIs), the executed APIs integrate data into a comprehensive view of the spares, enclosures and support entities based on the relational database, and further comprising:
   a plurality of data capture devices, each of the plurality of data capture devices designed to be associated with one of the spares, enclosures and support entities for the organization, wherein the plurality of data capture devices comprises data of the associated one of the spares, enclosures and support entities;
   wherein data capture devices may comprise at least one of radio frequency identification (RFID) tags, reader/scanner;
   wherein the processor enters the data received from the data collection devices into the relational database; and
   wherein the system is configured to allow a user to uniquely identify a location of or track the movement of a spare based on data received using at least one of a Radio Frequency Identification (RFID) system.

5. The system of claim 1, wherein the processor allows a user to create at least one of a graphical or text based report regarding one or more of the spares, enclosures and support entities, wherein the report includes at least one of absolute values, ranges or comparative values of at least a portion of the attributes, wherein the report is at least one of a filtering, sorting, or ordering of the spares, enclosures and support entities.

6. The system of claim 5, wherein the spares management module:
 shares spare information comprising at least one of a physical spare component data, order data, in-bound receiving data and deployment data;
 permits the management, display, tracking and reporting of spares information on a single user interface; and
 allows a user to define one or more perimeters within which each of the spares are located and to identify the spares within the one or more perimeters.

7. The system of claim 1,
 wherein the database comprises a manufacturer database configured to store all manufacturers and spares they provide in an individual group and across all groups; and
 wherein the user interface allows a user to perform at least one of browse, find, create, update or delete information associated with the spares, enclosures and the support entities, and the relationship information.

8. The system of claim 1, further comprising a remote access device that is in data communication with the processor via a public or private data network, wherein the remote access device comprises at least one of a mobile device, a laptop computer, a tablet computer or a desktop computer.

9. The system of claim 1, wherein the system synchronizes at least all the information for each spare and shows via the graphical user interface changes to status of a spare.

10. The system of claim 1,
 wherein the processor generates a graphical user interface that provides a three dimensional (3D) visualization of the racks and assets contained within racks to which spares have been deployed; and
 wherein the system generates a unique identifier based on a user defined spare search, wherein when the unique identifier that is presented on the graphical user interface, the unique identifier provides a visual indication of the presence and location of all spares that match the user defined spare search.

11. The system of claim 1, wherein the processor allows a user to:
 modify records of the spares, enclosures and support entities;
 display values of the attributes; and
 edit the values of the attributes within the relational database.

12. The system of claim 1, wherein the system provides pre-built workflows that automate key functions of the spares management process, wherein the pre-built workflows include Standard and Quick Receive workflows, Inventory workflow, Standard and Quick Deploy workflows and Delete Bin workflows.

13. The system of claim 1, wherein the processor semantically maps the received attributes from disparate sources and the manufacturers database, wherein the semantically mapped attributes provide context to the received attributes and the attributes' relation to spares and enclosures.

14. A method for semantically managing relationships and dependencies between spares, enclosures and support entities according to an industry specific manner, the method comprising:
 capturing relationship and dependency information between spares, enclosures and support entities for an organization from a user interface device;
 receiving attributes with associated measurements for the spares, enclosures and support entities for the organization from the user interface device, wherein the attributes with associated measurements are formatted according the specific industry of the organization, the attributes including for each type of spare an associated quantity;
 monitoring spares quantities across multiple data centers;
 generating and transmitting an alarm when the quantity of one type of spare falls below a threshold level; and
 automatically balancing spares quantities across multiple data centers, by:
  specifying, via the user interface device, multiple balancing rules, the multiple balancing rules selected from a first rule that specifies that at least a minimum quantity of spares be present in each of the multiple data centers, a second rule that specifies that no more than a maximum quantity of spares be present in each of the multiple data centers, and a third rule that specifies that spares be distributed substantially evenly across the multiple data centers, and a fourth rule that specifies a minimum total quantity of spares across all of the data centers, wherein each of the multiple balancing rules includes a corresponding action that is triggered when the rules is matched;
  specifying, via the user interface device, logical relationships and precedence between the multiple balancing rules, wherein the logical relationship incude logical operators including "and," "or," or "not" that are applied between the multiple balacing rules, wherein the specified precedence include an order in which the multiple balacing rules are to be applied;
  monitoring spares quantities across the multiple data centers; and
  initiating transfer of spares from a second one of the multiple data centers to the first data center, wherein the transferred spares are physical assets, wherein the transfer is based on the multiple balancing rules, the logical relationships and precedence between the multiple balancing rules, and the monitored spares quantities.

15. The method of claim 14, wherein one of the multiple balancing rules specifies that at least a minimum quantity of spares be present in each of the multiple data centers, and further comprising:
 when the quantity of one type of spare falls below the minimum quantity at a first one of the multiple data centers, initiating a transfer of spares from a second one of the multiple data centers to the first data center.

16. The method of claim 14, wherein one of the multiple balancing rules specifies that no more than a maximum quantity of spares be present in each of the multiple data centers, and further comprising:
 when the quantity of one type of spare rises above the maximum at a first one of the multiple data centers, initiating a transfer of spares from the first data center to a second one of the multiple data centers.

17. The method of claim 14, wherein one of the multiple balancing rules specifies that spares be distributed substantially evenly across the multiple data centers, and further comprising:
   when the quantity of one type of spare at a first one of the multiple data centers falls below half of the average number of spares across all of the multiple data centers, initiating a transfer of spares from a second one of the multiple data centers to the first data center, the second data center having more than the average number of spares.

18. The method of claim 14, wherein one of the multiple balancing rules specifies that no data center have more than a specified quantity of spares in excess of the quantity present at any other data center.

19. The method of claim 14, wherein one of the multiple balancing rules specifies a minimum total quantity of spares across all of the data centers, and wherein the spares management module is configured, in response to triggering of the balancing rule, to initiate the acquisition of additional spares from a supplier.

* * * * *